(12) United States Patent
Chizeck et al.

(10) Patent No.: US 9,223,459 B2
(45) Date of Patent: Dec. 29, 2015

(54) USING NEURAL SIGNALS TO DRIVE TOUCH SCREEN DEVICES

(71) Applicant: University of Washington through its Center for Commercialization, Seattle, WA (US)

(72) Inventors: Howard Jay Chizeck, Mercer Island, WA (US); Oliver Johnson, Seattle, WA (US); Jeffrey Herron, Seattle, WA (US)

(73) Assignee: University of Washington Through its Center for Commercialization, Seattle, WA (US)

( * ) Notice: Subject to any disclaimer, the term of this patent is extended or adjusted under 35 U.S.C. 154(b) by 85 days.

(21) Appl. No.: 14/163,574

(22) Filed: Jan. 24, 2014

(65) Prior Publication Data

US 2014/0210745 A1    Jul. 31, 2014

Related U.S. Application Data

(60) Provisional application No. 61/757,028, filed on Jan. 25, 2013.

(51) Int. Cl.
*A61B 5/04* (2006.01)
*A61B 5/0488* (2006.01)
*G06F 3/041* (2006.01)
*G06F 3/048* (2013.01)
*G06F 3/01* (2006.01)

(52) U.S. Cl.
CPC ............... *G06F 3/048* (2013.01); *G06F 3/015* (2013.01)

(58) Field of Classification Search
CPC ........... G06F 15/18; G06F 3/01; G06F 3/017; G06F 3/041; G06K 9/00; G09G 5/00; A61B 5/00; A61B 5/04; A61B 5/0488; A61B 5/0476; H03K 17/94; A61F 5/00
See application file for complete search history.

(56) References Cited

U.S. PATENT DOCUMENTS

| | | |
|---|---|---|
| 6,244,873 B1 | 6/2001 | Hill et al. |
| 6,720,984 B1 | 4/2004 | Jorgensen et al. |
| 8,170,656 B2 | 5/2012 | Tan et al. |
| 8,447,704 B2 | 5/2013 | Tan et al. |

(Continued)

OTHER PUBLICATIONS

F. Ahmad et al., "A Keystroke and Pointer Control Input Interface for Wearable Computers", Proceedings of the Fourth Annual IEEE International Conference on Pervasive Computing and Communications (PerCom 2006), Mar. 13, 2006, IEEE.

(Continued)

*Primary Examiner* — Charles Hicks
*Assistant Examiner* — Nguyen H Truong
(74) *Attorney, Agent, or Firm* — McDonnell Boehnen Hulbert & Berghoff LLP

(57) ABSTRACT

Methods and apparatus for using are provided for using neural signals to drive touch screen devices. An electromyography (EMG) device can receive neural based on electrical activity of one or more voluntary muscles of a user of the EMG device. The EMG device can filter the neural signals to generate a plurality of channel signals. A touch event can be determined based on the plurality of channel signals. The touch event can relates to user input for a touch-based interface of a touch-enabled device. The touch-enabled device can receive an indication of the touch event. The touch-enabled device can determine a touch operation for the touch-enabled device based on the touch event and then perform the touch operation.

16 Claims, 8 Drawing Sheets

(56) References Cited

U.S. PATENT DOCUMENTS

| | | | |
|---|---|---|---|
| 8,581,856 | B2 | 11/2013 | Benko et al. |
| 2007/0140562 | A1* | 6/2007 | Linderman .................. 382/187 |
| 2009/0326406 | A1* | 12/2009 | Tan et al. ..................... 600/546 |
| 2009/0327171 | A1* | 12/2009 | Tan et al. ........................ 706/12 |
| 2010/0302137 | A1* | 12/2010 | Benko et al. ................. 345/156 |
| 2012/0324391 | A1 | 12/2012 | Tocci |

OTHER PUBLICATIONS

J. Cheng et al., "Key-press Gestures Recognition and Interaction Based on SEMG Signals", Proceedings of the International Conference on Multimodal Interfaces and the Workshop on Machine Learning for Multimodal Interaction (ICMI-MLMI 2010), Nov. 8, 2010, ACM.

Ahsan, Md., Ibranhimy, M., Khalifa. EMG signal classification for human computer interaction: A review European Journal of Scientific Research. 2009; 33(3): 480-501.

Choi, Changmok. Development and quantitative performance evaluation of a noninvasive EMG computer interface. IEEE Transactions on Biomedical Engineering, Jan. 2009; 56(1): 188-191.

Cioni G, Sales B, Paolicelli Pb, Petacchi E, Scusa MF, Canapicchi R. MRI and clinical characteristics of children with hemiplegic cerebral palsy. Neuropediatrics. 1999; 30(5): 249-255.

Costanza, E., Inverso, S., Allen, R. Toward subtle intimate interfaces for mobile devices using an EMG controller. Proc. SIGCHI Conference on Human Factors in Computing Systems, 2005, 481-489.

Dorsey ER, Constantinescu R, Thompson JP, Biglan KM, Holloway RG, Kieburtz K, Marshall FJ, Ravina BM, Schifitto G, Siderowf A, Tanner CM. Projected Number of people with Parkinson disease in the most populous nations, 2005 through 2030. Neurology. 2007; 68: 384-386.

Hammel JM. The role of assessment and evaluation in rehabilitation robotics research and development: moving from concept to clinic to context. IEEE Transactions on Rehabilitation Engineering. 1995; 3(1): 56-61.

Hirtz D, Thurman DJ, Gwinn-Hardy K, Mohamed M, Chaudhuri AR, Zalutsky R. How common are the "common" neurologic disorders? Neurology. 2007; 68: 326-33.

Lai SM, Studenski S, Duncan PW, Perera S. Persisting consequences of stroke measured by the Stroke Impact Scale. Stroke. 2002; 33: 1840-1844.

Lawrence RC, Helmick CG, Arnold LM, Choi H, Deyo RA, et al. Estimates of the prevalence of arthritis and other rheumatic conditions in the United States. Arthritis & Rheumatism. 2008; 58(1): 26-35.

Lloyd-Jones D, Adams RJ, Brown TM, Camethon M, Dai S, et al. Heart disease and stroke statistics—2010 update: a report from the American Heart Association. Circulation. 2010; 121: e46-e215.

Mahoney FI, Barthel D. Functional evaluation: the Barthel Index. Maryland State Medical Journal. 1965; 14: 56-61.

Mold JW, Vesely SK, Keyl BA, Schenk JB, Roberts M. The prevalence, predictors, and consequences of peripheral sensory neuropathy in older patients. Journal of the American Board ofFamilyMedicine. 2004; 17:309-318.

Nasreddine ZS, Phillips NA, Bedirian V, Charbonneua S, Whitehead V, Collin I, Cummings JL, Chertkow H. The Montreal Cognitive Assessment (MoCA©): a brief screening tool for mild cognitive impairment. Journal of the American Geriatrics Society. 2005; 53: 695-699.

Lilt RJ, Baba Y, Wszolek ZK, Putzke DJ. Defining the Parkinson's disease phenotype: initial symptoms and baseline characteristics in a clinical cohort. Parkinsonism and Related Disorders. 2005; 11: 139-145.

Wheeler, K.R. Device control using gestures sensed from EMG. IEEE Workshop on Soft Computing in Industrial Applications, Jun. 2003; 21-26.

Ziegler-Graham K, MacKenzie EJ, Ephraim PL, Travison TG, Brookmeyer R. Estimating the prevalence oflimb loss in the United States: 2005 to 2050. Archives of Physical Medicine & Rehabilitation. 2008; 89(3): 422-9.

* cited by examiner

USING NEURAL SIGNALS TO DRIVE TOUCH SCREEN DEVICES

CROSS-REFERENCE TO RELATED APPLICATIONS

The present application claims priority to U.S. Provisional Patent Application No. 61/757,028, entitled "Using Neural Signals to Drive Touch Screen Devices", filed Jan. 25, 2013, which is entirely incorporated by reference herein for all purposes.

STATEMENT OF GOVERNMENT RIGHTS

None.

BACKGROUND OF THE INVENTION

Unless otherwise indicated herein, the materials described in this section are not prior art to the claims in this application and are not admitted to be prior art by inclusion in this section.

For millions of Americans, the ability to effectively use their hands is limited due to neurological or musculoskeletal diseases. Upper extremity dysfunction is prevalent among people with central nervous system disorders, which can be acquired, congenital, or degenerative in nature. For example, over 6 million Americans are stroke survivors, and even highly recovered stroke survivors have significant residual disability in hand function impacting the ability to perform basic and instrumental activities of daily living. Approximately 200,000 Americans have cerebral palsy, with impairments of the upper extremities among the most common features. Multiple sclerosis and Parkinson's disease, which are degenerative neurologic conditions, affect over a quarter of a million Americans each.

Upper extremity symptoms are common in these disorders, as well. For example, nearly 70% of people with Parkinson's disease experience initial symptoms that affect the upper extremities. Injuries affecting the peripheral nervous system can also impact upper extremity function. Over half a million Americans are estimated to have upper extremity amputations, and peripheral neuropathy affects a quarter of adults aged 65 and older, with increasing prevalence with age. Finally, diseases of the musculoskeletal can affect upper extremity function. For example, it is estimated that over 13 million Americans have symptomatic hand osteoarthritis.

Devices that enable improved functioning for individuals with limited hand use could significantly impact a large proportion of the population. For example, consider the difference between a mouse that can act on an exact pixel versus the experience of a finger touching perhaps hundreds of pixels on a touch-enabled device, such as a touch-based smartphone or tablet. Yet in playing a popular touch-enabled game, the touch-enabled device can use touches alone to determine a precise angle for a ballistic calculation and a precise time to release a projectile.

Gestures can be used as control inputs for human computer interaction. Typical gesture-based systems try to decode the full gesture being performed by the user. This has a direct natural learning curve for the person, as they perform hand or body gestures and the device does the heavy lifting to compute the motion. However, decoding gestures is technically complex, often requiring a relatively large number of electromyography (EMG) electrodes. Further, gestures may not map directly to the input signals used by mobile devices. Additionally, gestures are not common across populations of users with varying degrees of motor ability.

SUMMARY

In one aspect, a method is provided. An electromyography (EMG) device receives one or more neural signals. The one or more neural signals are based on electrical activity of one or more voluntary muscles of a user of the EMG device. The EMG device filters the one or more neural signals to generate a plurality of channel signals. A touch event is determined based on the plurality of channel signals. The touch event relates to user input for a touch-based interface of a touch-enabled device. The touch-enabled device receives an indication of the touch event. The touch-enabled device determines a touch operation based on the touch event. The touch-enabled device performs the touch operation using the touch-enabled device.

In another aspect, an EMG device is provided. The EMG device includes one or more electrodes, a processor, and a non-transitory tangible computer readable medium. Each of the one or more electrodes is configured to receive one or more neural signals based on electrical activity of one or more voluntary muscles of a user of the EMG device. The non-transitory tangible computer readable medium is configured to store at least executable instructions. The executable instructions, when executed by the processor, cause the EMG device to perform functions including: filter the one or more neural signals to generate a plurality of channel signals; determine a touch event based on the plurality of channel signals, wherein the touch event relates to a user input for a touch-based interface of a touch-enabled device; and send an indication of the touch event.

In another aspect, a system is provided. The system includes an EMG device and a touch-enabled device. The EMG device is configured to at least: receive one or more neural signals, where the one or more neural signals are based on electrical activity of one or more voluntary muscles of a user of the EMG device; filter the one or more neural signals to generate a plurality of channel signals; and send the plurality of channel signals. The touch-enabled device includes a touch-based interface. The touch-enabled device is configured to at least: receive the plurality of channel signals; determine a touch event based on the plurality of channel signals, where the touch event relates to a user input for the touch-based interface; determine a touch operation based on the touch event, and perform the touch operation.

This system of an EMG device and a touch-enabled device provides the advantage of enabling a user with limited or no finger dexterity to control touch-enabled devices using neural signals obtained by the EMG device from muscles under the user's control. The system can be used without making publicly visible gestures; rather, non-obvious muscle actions can be used to increase user privacy. The EMG device can be calibrated easily and frequently to ensure proper function of the system. The calibration can be performed periodically, upon request, or automatically. The system can provide control using discrete actions and corresponding neural signals over temporally and/or spatially continuous command signals.

DETAILED DESCRIPTION

Figure 1A:
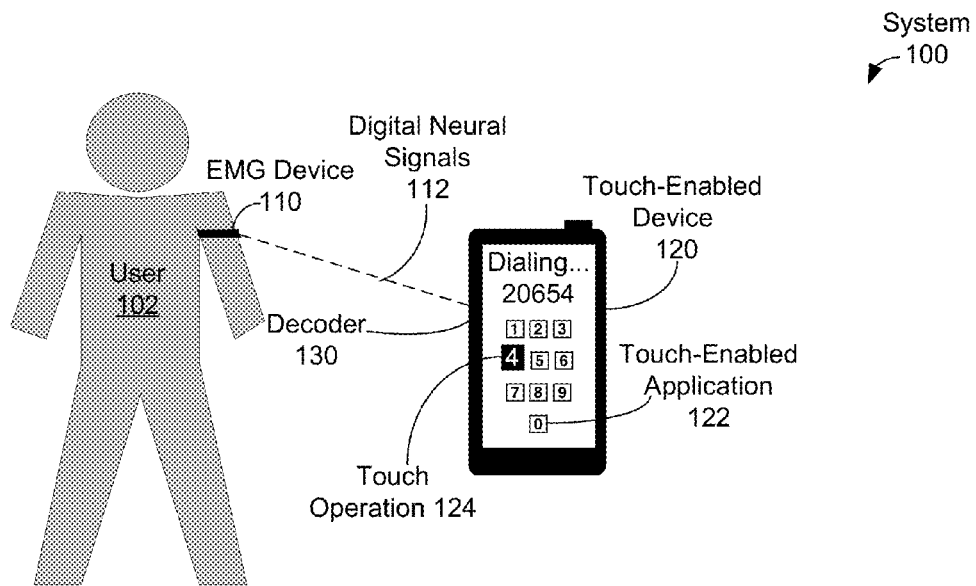
FIG. 1A illustrates a system where a user is using an EMG device to communicate with a touch-enabled device, in accordance with an embodiment.

People with limited finger dexterity can find it difficult to take advantage of the increasingly large number of useful software applications that are available for touch-enabled devices, such as smart phones, tablets, and other devices that have touch-based interfaces; e.g., touch screens. These applications include aspects for entertainment, education, employment, purchasing, communication, and other activities of daily living. This patent application addresses these needs by disclosing apparatus and techniques, including a system that enables people who have limited finger dexterity to utilize touch-enabled device.

The system can include an electromyography (EMG) device and a modified touch-enabled device. The EMG device can include surface EMG electrodes to acquire neural signals from voluntary muscles of the user; e.g., arm muscles, leg muscles, cranial muscles, and transform the neural signals. For example, the system can convert neural signals into a relatively small number of channels of touch-related information, such as one or more channels related to screen positioning. Each channel can include channel information, such as channel signals that correspond to channel states. A calibrated and trained decoder of the system can map the channel information into touch events for controlling of the touch-enabled device. The decoder can be calibrated either manually or automatically.

The EMG device can provide channel information and/or touch events to the touch-enabled device using a wireless protocol, such as a Bluetooth® protocol or a Wi-Fi® protocol. The touch-enabled device can use middleware to convert the received channel signals and/or the touch events as needed to internal commands representing finger motions. These internal commands can be provided to software applications that operate based on the finger motions. For example, the internal commands can be the same internal commands that would be generated when a user touches a touch screen with his/her fingers. This middleware can be translated to different operating systems and devices, providing a user with limited finger dexterity with options in choosing a touch-enabled device.

The privacy of users of the system can be protected. The system can be utilized to minimize or eliminate external appearance that an assistive device is being used. For example, the EMG device can be implemented in a band or sleeve so that neural signals can be obtained from small muscle motions, and so not make it obvious how the user is controlling the touch-enabled device. By generating touch events and corresponding internal commands from neural signals just like a touch-based interface processes physical touches, the system can prevent remote devices from detecting that the user is employing a myoelectric-based system rather than usual finger-generated commands.

Thus, this system provides a relatively easy-to-use and inexpensive interface to touch-enabled devices for those whose finger dexterity may not enable use of touch-enabled devices. The system can calibrate itself to ensure neural signals are properly read from the user and processed to generate touch events for the touch-enabled device. The system can be configured to be secure and usable in public. Further, many individuals with limited or no finger dexterity can use the system to enhance their lives by interacting with the myriads of applications on touch-enabled devices now available.

Systems for Controlling Touch-Enabled Devices Via EMG Signals

FIG. 1A illustrates system 100 with user 102 using EMG device 110 to communicate with touch-enabled device 120, in accordance with an embodiment. FIG. 1A shows that user 102 is in the process of making a phone call using touch-enabled application 122 of touch-enabled device 120. User 102 has dialed the digits "20654" as displayed by application 122, which also indicates touch operation 124 of dialing the digit "4".

User 102 can generate analog neural signals using voluntary muscles in contact with EMG device 110. EMG device 110 can include electrodes that contact voluntary muscles of an arm of user 102, as shown in FIG. 1A. The voluntary muscles in the in-contact arm can make muscle movements which generate analog neural signals detectable by EMG device 110. EMG device 110 can convert analog neural signals obtained via the included electrodes to digital neural signals 112.

Digital neural signals 112 can be correlated to information about a touch-based interface, such as a touch screen, of touch-enabled device 120. For example, when user 102 moves the in-contact arm with EMG device 110 upward (or downward), then this movement can be correlated to an upward (or downward) motion of a point of contact on touch-based interface; e.g., moving up (or down) a virtual finger touching touch-enabled device 120. As another example, when user 102 moves their in-contact arm forward (or backward), then this movement can be correlated to starting a touch (or ending the touch) at the point of contact on touch-based interface; e.g., putting a virtual finger down on (or lifting the virtual finger up from) touch-enabled device 120. Many other movements/actions/gestures and correlated information about touch-based interfaces are possible as well.

Touch-enabled device 120 can include decoder 130 to translate digital neural signals into touch events. Software in touch-enabled device 120 can process touch events, as needed, to cause touch-enabled device 120 to perform touch operations and so emulate physical touches of touch-enabled device 120.

As shown in FIG. 1A, digital neural signals 112 can include signals that indicate that user 102 has performed touch operation 124. Touch operation 124 involved touching a position on touch-based interface position over the number "4" on the keypad displayed on touch-enabled device 120. In response, touch-enabled application 122 has acted as if user 102 touched the number "4" on the keypad with a finger—application 122 has update the display of keypad 122 to show the touch of the number "4" and has added the digit 4 to the digits for dialing listed on touch-enabled device 120.

Figure 1B:
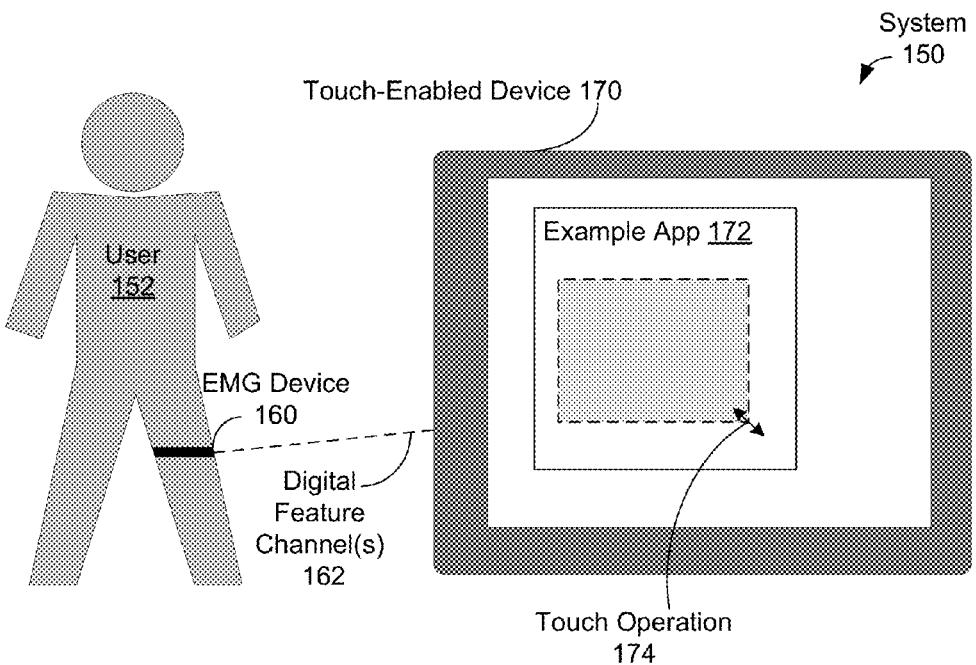
FIG. 1B illustrates another system where a user is using an EMG device to communicate with a touch-enabled device, in accordance with an embodiment.

FIG. 1B illustrates system 150 with user 152 using EMG device 160 to communicate with touch-enabled device 170, in accordance with an embodiment. FIG. 1B shows that user 152 is in the process of drawing a rectangle using touch-example application 172 of touch-enabled device 170. User 152 has selected the lower-right corner of the rectangle, perhaps to change the size of the rectangle, as displayed by application 172.

User 152 can generate the analog neural signals using voluntary muscles in contact with EMG device 160. As with EMG device 110, EMG device 160 can include electrodes that contact voluntary muscles of a user. In the example shown in FIG. 1B, EMG device 160 is in contact with muscles of a leg of user 152. The voluntary muscles in the in-contact leg can make muscle movements which generate analog neural signals detectable by EMG device 110.

As with EMG device 110, EMG device 160 can convert analog neural signals into digital neural signals. The digital neural signals can be translated to digital feature channel(s) 162. Each digital feature channel of digital feature channel(s) 162 can carry channel signals conveying information about a touch-based interface for touch-enabled device 170. Example digital feature channels can carry: information about a horizontal/X-axis position for addressing a touch-based interface, such as a touch screen, of touch-enabled device 170, information about a vertical/Y-axis position for addressing touch-enabled device 170, and information about minimum and maximum values of neural signals with respect to the width and height of the touch-based interface. Another channel can convey intent of the user with respect to the touch-based interface: e.g., the user can intend to touch the touch-based interface or not to touch the touch-based interface. Other channels and channel signals are possible as well.

Channels can represent one or more virtual fingers—for example, one group of channels can represent a virtual finger VF1 and a second group of channels can represent a virtual finger VF2. Touch events related to single finger operations and multi-finger operations can be generated using data for VF1 and VF2. For example, a single finger drag operation can be observed when data for VF1 (or VF2) indicates that: (a) the virtual finger is "down" or intended to touch the touch-based interface, as opposed to being "up" or not intended to touch the touch-based interface, and (b) horizontal and vertical positioning indicates virtual finger movement. As another example, a touch event for a multi-finger pinch operation can be generated when channel signals for VF1 indicate that (a) VF1 is down and (b) horizontal and vertical positioning of VF1 is coming toward VF2, while channel signals for VF2 indicate that (c) VF2 is down and (d) horizontal and vertical positioning of VF2 is coming toward VF1.

EMG device 160 can send digital feature channels 162 to touch-enabled device 170, where software in touch-enabled device 170 can process digital feature channels 162 to cause touch-enabled device 170 to perform touch operations, such as touch operation 174, and so emulate physical touches of touch-enabled device 170.

FIG. 1B shows that application 172 can indicate performance of touch operation 174. Touch operation 174 involved dragging a lower-right corner of a rectangle, perhaps to resize the rectangle. Application 172 has indicated touch operation 174 by displaying a double-arrowhead icon located at the lower-right corner of the rectangle, as shown in FIG. 1B. In response to this touch operation and later touch operations, user 172 can resize or otherwise change display of the rectangle.

An EMG device, such as EMG device 110 or EMG device 160, can receive indicia of volitional muscle activity, such as neural signals from voluntary muscle. For example, the EMG device can use one or more EMG electrodes, such as Uni-Patch™ EMG electrodes from Covidien plc of Dublin, Ireland to obtain neural signals. An amplifier, such as an INA 326 chip from Texas Instruments of Dallas, Tex., can receive neural signals and output a continuous filtered analog voltage. The continuous analog voltage can be converted to digital signal information represented as a channel carrying channel information. The channel information can include channel signals and channel states related to touch events. Each channel can be related basic control data for the touch events, such as, but not limited to, a horizontal, or x, position on a screen of the touch-enabled device, a vertical, or y, position on the screen, and a finger up/down control. Many other channels are possible as well.

In some embodiments, such as EMG device 160, the EMG device can include a decoder to map channel information into touch events related to substituted operations and virtual finger positions. The decoder is discussed in more detail below in the context of at least FIGS. 2B and 3.

Users can use EMG devices to communicate with other interfaces and devices, such as, but not limited to, graphical user interfaces (GUIs) of computing devices that may not have touch-enabled interfaces, remotely-controllable devices, and robotic devices.

Figure 1C:
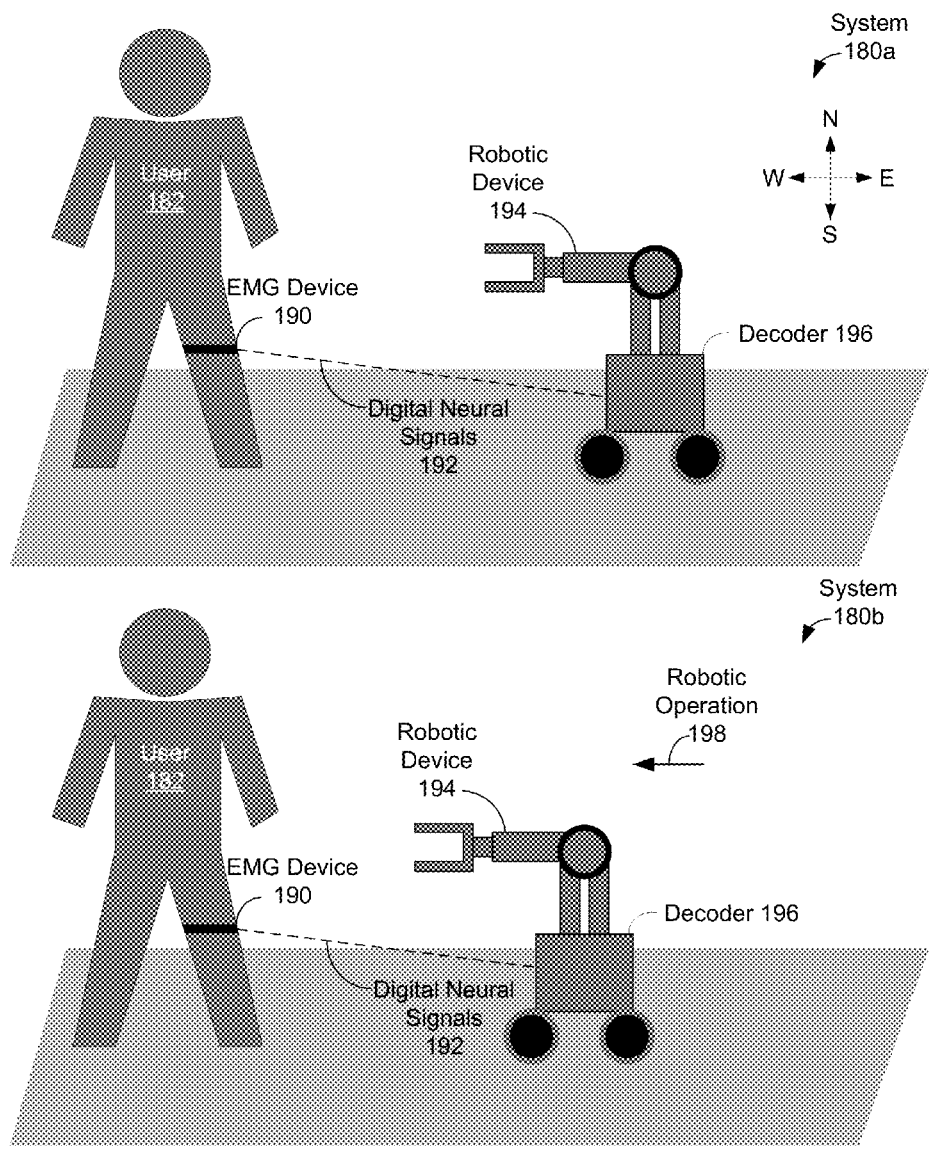
FIG. 1C illustrates a system where a user is using an EMG device to communicate with a robotic device, in accordance with an embodiment.

FIG. 1C illustrates systems 180a, 180b with user 182 using EMG device 190 to communicate with robotic device 194, in accordance with an embodiment. System 180a, shown in the upper portion of the sheet for FIG. 1C, shows user 182 using EMG device 190 to communicate with robotic device 194 via digital neural signals 192. For example, EMG device 190 can include the functionality to obtain analog neural signals and convert the analog neural signals to digital neural signals discussed above in the context of EMG device 120 and FIG. 1A.

Touch-enabled device 120 can include decoder 130 to translate digital neural signals into robotic operations, such as, but not limited to: (1) an operation to moving a robot in a direction; e.g., left, right, forward, backward, up, down, north, south, east, west; (2) an operation to rotate the robot in a direction, (3) moving an effector; e.g., arm, hand, of the robot in a direction; (4) rotating an effector in a direction, (5) operating the effector; e.g., opening a hand, closing a hand, rotating an effector, (6) power up/down the robot, (7) and provide maintenance/status information about the robot; e.g., information to diagnose and repair the robot, battery/power level information.

In the example shown in FIG. 1C, user 182 uses EMG device 190 to provide digital neural signals to robotic device 194 corresponding to a robotic operation to move robotic device 194 closer to user 184; e.g., move in a westward direction. System 180b shows a configuration after robotic device 194 has carried out robotic operation 198 to move westward toward user 198.

Figure 2A:
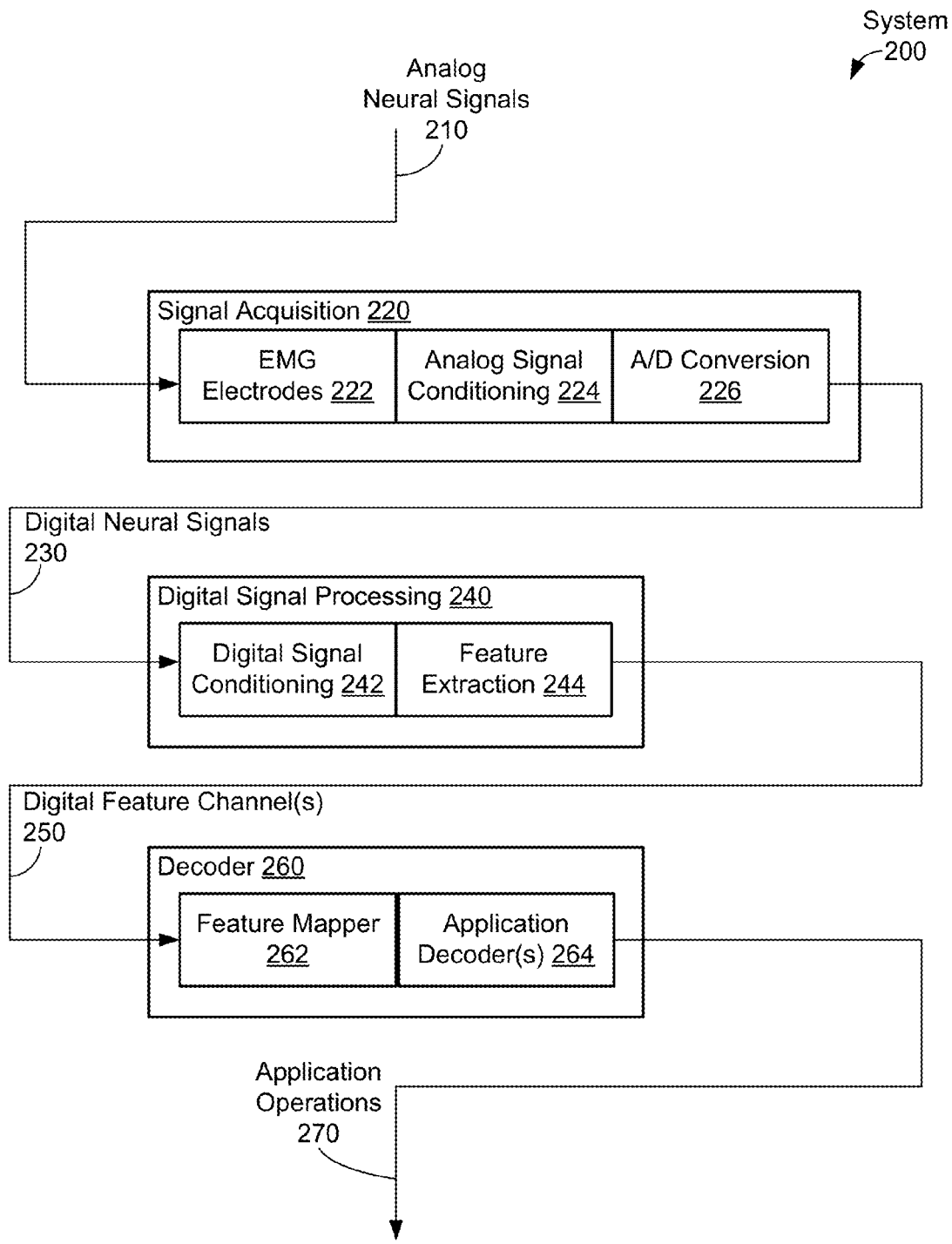
FIG. 2A is a block diagram of a system for transforming neural signals to application-specific operations, in accordance with an embodiment.

FIG. 2A is a block diagram of system 200 for transforming neural signals to application-specific operations, in accordance with an embodiment. System 200 includes signal acquisition component 220, digital signal processing component 240, and decoder 260.

Signal acquisition component 220 can receive analog neural signals 210 from a user, such as discussed above in the context of FIGS. 1A-1C, and generate digital neural signals

230 as an output. Signal acquisition component 220 can include EMG electrodes 222, analog signal conditioning component 224, and analog/digital (A/D) conversion component 226. EMG electrodes 222 can obtain analog neural signals 210 from a user. Examples of EMG electrodes include, but are not limited to, dry electrodes, wet electrodes, wet gel electrodes, and conductive fabric patches. In particular, dry electrodes can be, but are not limited to, dry silver-silver chloride (Ag—AgCl) electrodes.

EMG electrodes 222 can be configured to provide obtained analog neural signals to analog signal conditioning component 224. Analog signal conditioning component 224 can filter, amplify, and/or otherwise modify the obtained analog neural signals to generate conditioned analog neural signals. Analog signal conditioning component 224 can include but is not limited to including, amplifiers, operational amplifiers, low-pass filters, band-pass filters, high-pass filters, anti-aliasing filters, other types of filters, and/or signal isolators.

Analog signal conditioning component 224 can be configured to provide conditioned analog neural signals to analog/digital conversion component 226. Analog/digital conversion component 226 can sample conditioned analog neural signals at a sampling rate; e.g., 256 samples per second, 1000 samples per second. The obtained samples can represent voltage, current, or another quantity. A sample can be resolved into a number of levels; e.g., 16 different levels, 256 different levels. Then, digital data such as a bitstream of bits for each sample representing a level for the sample can be output as digital neural signals 230.

For example, if a current is sampled between 0.01 and 0.21 amperes and resolved into four levels, the four levels can correspond to current in level 0 of 0.01 to 0.05999 . . . amperes, level 1 of 0.06 to 0.10999 . . . amperes, level 2 of 0.11 to 0.15999 . . . amperes, and level 3 of 0.16 to 0.21 amperes. These four levels can be represented using two bits; e.g., bits 00 for level 0, bits 01 for level 1, bits 10 for level 2, and bits 11 for level 3.

As another example, suppose a conditioned analog neural signal has a voltage range from V1 volts to V2 volts, and the neural signal is sampled within the voltage range and resolved into sixteen levels. Then, analog/digital conversion component 226 can output each sample as four bits that represent the sixteen levels. Many other sampling rates, sampled quantities, and resolved number of levels are possible as well.

Digital signal processing component 240 can receive digital neural signals 230 from signal acquisition component 220 as inputs and generate digital feature channel(s) 250 as output(s). Signal acquisition component 220 can communicate with digital signal processing component 240 using communications that are based on a signaling protocol, such as but not limited to, a Bluetooth® protocol, a Wi-Fi® protocol, a Serial Peripheral Interface (SPI) protocol, a Universal Serial Bus (USB) protocol, and/or a ZigBee® protocol. For example, digital signal processing component 240 can be a portion of, can be, or can include a digital signal processor. In some embodiments, digital signal conditioning component 242 and feature extraction component 244 can be a single component.

Digital signal processing component 240 can include digital signal conditioning component 242 and feature extraction component 244. Digital signal conditioning component 242 can process received digital neural signals 230 to generate conditioned digital neural signals. Digital signal conditioning component 242 can perform operations, such as filtering, rectifying, averaging, transforming, and/or otherwise process, on digital neural signals 230. For example, signal conditioning component 242 can include Fast Fourier Transform (FFT) components, band filters, rectifiers, notch filters, such as 60 Hz notch filter(s).

Feature extraction component 244 can receive conditioned digital neural signals as inputs and generate digital feature channel(s) 250 as output(s). Digital feature channel(s) 250 can include information about changes in neural signals that are related to a device to be controlled, such as a touch-enabled device, another computing device, or a robotic device.

For example, if a change in neural signal indicates that a user has started or stopped using a muscle M, then this change can be conveyed as a channel signal for a channel of information about a touch-enabled device related to muscle M. Continuing this example, if muscle M is related to moving left on a touch-enabled device, then Table 1 below shows example changes in the state of muscle M and corresponding change in leftward movement

TABLE 1

| Change in Muscle M | Change in Leftward Movement of Touch-Enabled Device |
|---|---|
| From resting to active | Move left |
| From active to resting | Stop movement left |
| No change | Continue moving left if already moving left; otherwise do not move left. |

In some embodiments, three channel signals can be used: two channel signals dedicated to moving the cursor in the x and y directions on screen and a third channel signal carrying data for a semi-continuous linear scaling that relates the minimum and maximum values of the muscle signal to the width and height of the screen. In other embodiments, different channel signals can be used; e.g., a channel carrying semi-continuous linear scaling can be replaced by a channel carrying touch/no-touch related information. In still other embodiments, more than three channel signals are used, depending on the capabilities of the individual and the complexity of tasks provided by the software.

Several techniques can be used to generate information in digital feature channel(s) 250. For example, feature extraction component 244 can estimate a power spectrum from the conditioned digital neural signals to generate differential EMG power values. The differential EMG power values can be information about a device to be controlled, where this information can be conveyed in digital feature channel(s) 250. In another example, feature extraction component 244 can perform fast Fourier transform (FFT) that operates on buffered data to sum total energy within a particular frequency band and so determine overall EMG strength, where the EMG strength information can be conveyed in digital feature channel(s) 250.

As even another example, feature extraction component 244 can apply a wavelet transform to generate wavelet coefficients, where the wavelet coefficients can be information about a device to be controlled. In yet another example, conditioned digital neural signals can be compared to Boolean thresholds and information about a device to be controlled can be generated based on the comparisons.

In still another example, feature extraction component 244 can apply empirical mode decomposition techniques to the conditioned digital neural signals. An empirical mode decomposition attempts to decompose a signal or signals, such as the conditioned digital neural signals, into a sum of intrinsic mode functions. An intrinsic mode function is a function with the same number of extrema and zero crossings (or at most the numbers differ by one), and with each envelope being symmetric with respect to zero, where an envelope is a function defined by a local maximum and a local minimum of the signal. Envelopes can be generated, for example, by connecting local maxima and local minima using separate cubic splines. Many other techniques can be used to generate digital feature channel(s) from conditioned digital neural signals. The represented information about a device can then be output in digital feature channel(s) 250.

Decoder 260 can receive digital feature channel(s) 250 as input(s) from digital signal processing component 240 and generate application operations 270 as output. Digital signal processing component 240 can communicate with decoder 260 using communications that are based on a signaling protocol, such as but not limited to, a Bluetooth® protocol, a Wi-Fi® protocol, a Serial Peripheral Interface (SPI) protocol, a Universal Serial Bus (USB) protocol and/or a ZigBee® protocol. For example, decoder 260 can be a portion of, can be, or can include a computing device. In some embodiments, feature mapper 262 and application decoder(s) 264 can be a single component.

Digital feature channel(s) 250 can include information about changes in neural signals. These changes in neural signals can be related to aspects of a touch-enabled device, such as touch-enabled device 120, and illustrated above in an example shown in part by Table 1.

Channel states can be determined based on the channel signals. Some or all of the channel signals can be binned into different states for different actions, with a rest-state in each channel to allow neutral (free-moving) operation. In some embodiments, the binning the these channels may be extended by using additional channels, depending on how many of the multi-touch actions are needed and the desired level of control of those actions, and how well the person is able to control the muscle on that channel to reliably stay within the range for each bin. For example, if higher muscle function users find it less difficult to keep a value V with the particular range of values than lower muscle function users, then binning of the value V can involve use of relatively-narrow ranges of values for bins for higher muscle function users and relatively-wide ranges of values for bins with lower muscle function users.

To continue the leftward motion channel example discussed above with respect to Table 1, Table 2A shows the "Change in Leftward Movement" of previously-discussed Table 1 as a "Channel Signal" column.

TABLE 2A

| Change in Muscle M | Channel Signal | Channel State |
| --- | --- | --- |
| From resting to active | Move left | Leftward Movement + X-axis position reduced to move left |
| From active to resting | Stop movement left | No Leftward Movement + X-axis position |
| No change | Continue moving left if already moving left; otherwise do not move left. | <maintain previous state> |

Feature mapper 262 can observe information in digital feature channel(s) 250 and generate channel signals or channel states as outputs. That is, feature mapper can take information corresponding to changes in neural signals in digital feature channel(s) 250 (e.g., differential power values, wavelet coefficients, or other information related to muscle M) and map the changes to channel signals or channel states.

In the example shown in Table 2A, a change by muscle M from resting to active, conveyed as information digital feature channel(s) 250, can be mapped to a channel signal of "Move left" and/or a corresponding channel state of "Leftward Movement" with an X-axis position that has been reduced to move left. In this example, the X-axis position increases for rightward movements up to a right limit, stays the same for no movement, and decreases for leftward movements down to a left limit. That is, by activating muscle M, a user can generate a neural signal that is translated to a channel signal of "Start moving left" or a channel state of "Leftward Movement" and a decreasing X-axis position, until the left limit is reached.

Table 2B shows another example set of changes in Muscle M, channel signals, and corresponding channel states. In this example as with the example of Table 2B, the X-axis position increases for rightward movements up to the right limit, stays the same for no movement, and decreases for leftward movements down to the left limit.

TABLE 2B

| Change in Muscle M | Channel Signal | Channel State |
| --- | --- | --- |
| From resting to active | X-axis position is reduced down to left limit | Leftward Movement + X-axis position |
| From active to resting | X-axis position does not change | No Leftward Movement + X-axis position |
| No change | Continue reducing X-axis position if already moving left; otherwise do not change X-axis position | <maintain previous state> |

In the example shown in Table 2B, a change by muscle M from resting to active, conveyed as information digital feature channel(s) 250, can be mapped to a channel signal of an X-axis position that has been reduced to move left until the left limit is reached. That is, by activating muscle M, a user can generate a neural signal that is translated to a channel signal of a decreasing X-axis position, until the left limit is reached. This channel signal can be indicated as a "Leftward Movement" channel state that also includes the X-axis position. Channel states in the example of Table 2B can be readily derived from the channel signal data; e.g., a "Leftward Movement" channel state can be determined by observing if the X-axis position channel signal is reduced within a pre-determined amount of time. Therefore, in this example, the channel signal provides enough information that channel states may not be needed.

Application decoder(s) 254 can then decode the channel signals or channel states generated by feature mapper 262 to determine application operations, such as, but not limited to, touch events for a touch-enabled interface, GUI events, such as virtual mouse/pointer actions, related to a GUI, or robotic events such as gripper control actions related to a robotic device. For example, a touch event related to leftward movement can include a touch event(s) related to detecting a touch an initial location on a touch-enabled device and leftward movement(s) of the initial location; e.g., a drag operation leftward. Example application decoders 350, 352, and 354 are discussed below in the context of FIG. 3. The determined application operations can be output from system 200 as application operations 270.

Figure 2B:
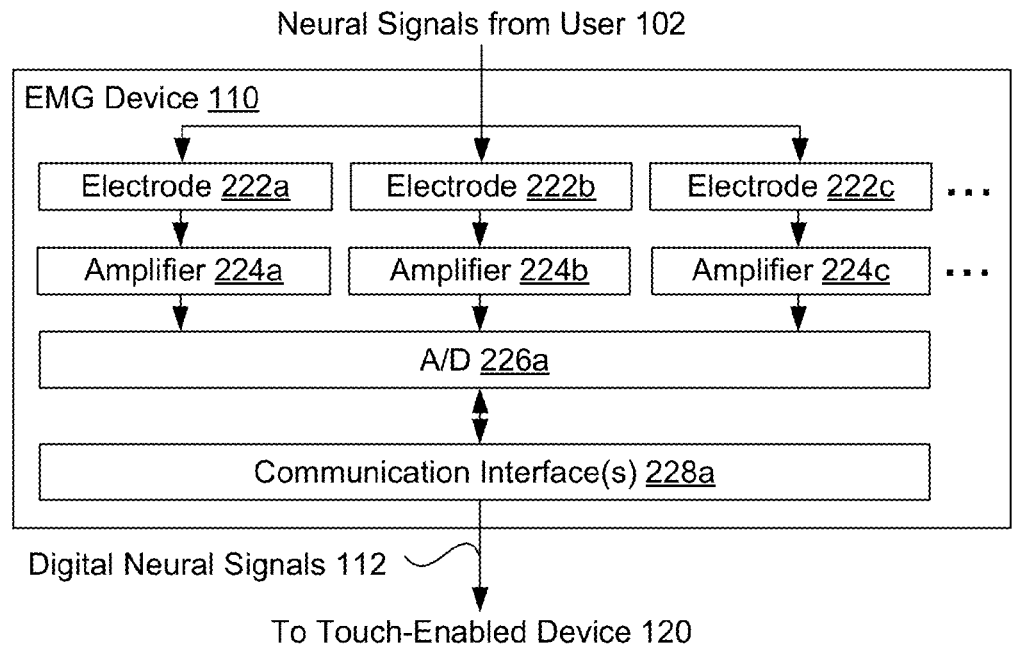
FIG. 2B is a block diagram of the EMG device depicted in FIG. 1A, in accordance with an embodiment.

FIG. 2B is a block diagram of EMG device 110 also depicted in FIG. 1A, in accordance with an embodiment. EMG device 110 can include electrodes 222a, 222b, 222c, amplifiers 224a, 224b, 224c, analog/digital conversion component 226a, and communication interface 228a.

EMG device 110 can receive neural signals from user 102 and process the received neural signals to generate digital neural signals 112. For example, EMG device 110 can receive signals from nerves used to control voluntary muscles of user 102. User 102 generates these neural signals to move the corresponding voluntary muscles. EMG device 110 can be placed on user 102 so that some or all of electrodes 222a, 222b, 222c are in contact with the voluntary muscles. Then, when user 102 generates neural signals for the voluntary muscles, electrodes 222a, 222b, 222c can capture the neural signals as electrical impulses and provide the neural signals to the remainder of EMG device 110 for further processing, as discussed above with respect to electrodes 222 of FIG. 2A In some embodiments, EMG device 110 can be configured as a band, brace, sleeve, or other article of clothing/object to be worn by user 102. In these embodiments, EMG device 110 can be worn so that electrodes 222a, 222b, 222c are in contact with the voluntary muscles user 102 will use to control a touch-enabled device; e.g., touch-enabled device 120 of system 100 shown in FIG. 1A. In other embodiments, EMG device 110 can be configured as a network of electrodes; e.g., a personal area network of distributed electrodes.

Each of electrodes 222a, 222b, 222c can provide analog neural signals to respective amplifier 224a, 224b, 224c; e.g., as discussed above in the context of electrodes 222 of FIG. 2A. For example, amplifier 224a can receive neural signals from electrode 222a and increase power of, or amplify, the received neural signals. Amplifiers 224a, 224b, 224c can provide amplified analog neural signals to analog to analog/digital conversion component 226a. In some embodiments, amplifiers 224a, 224b, 224c can be part of, or be, analog signal conditioning component 224 discussed above in the context of FIG. 2A. In other embodiments, there can be more or less than one amplifier per electrode.

Analog/digital conversion component 226a can convert amplified analog neural signals to generate digital neural signals, such as discussed above in the context of analog/digital conversion component 226 of FIG. 2A. The digital neural signals generated by analog/digital conversion component 226a can be provided as digital neural signals 112 to touch-enabled device 120 using communication interface 228a. Communication interface 228a can establish, maintain, and tear down communications between EMG device 110 and other devices, such as but not limited to touch-enabled device 120. For example, communication interface 240 can include part, all, or additional functionality to network-communication interface module 522 discussed below in the context of FIG. 5B and/or the communication functionalities discussed above in the context of FIG. 2A. In particular, communication interface 240 can have one or more wireless interfaces, such as wireless interface 527, and/or one or more wired interfaces, such as wired interface 528, with wireless interface 527 and wired interface 528 discussed below in the context of FIG. 5B.

Figure 2C:
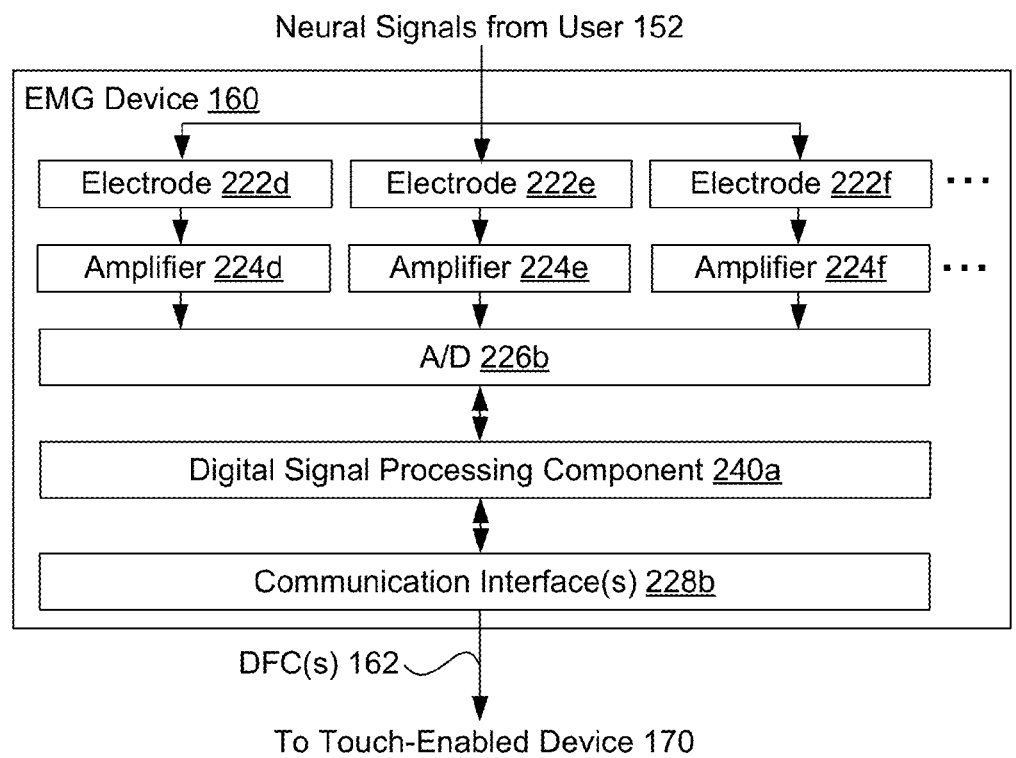
FIG. 2C is a block diagram of the EMG device depicted in FIG. 1B, in accordance with an embodiment.

FIG. 2C is a block diagram of EMG device 160 also depicted in FIG. 1B, in accordance with an embodiment. EMG device 160 can include electrodes 222d, 222e, 222f, amplifiers 224d, 224e, 224f, analog/digital conversion component 226b, digital signal processing component 240a, and communication interface 228b. Electrodes 222d, 222e, 222f can have the functionality of electrodes 222 discussed above with respect to FIG. 2A and/or electrodes 222a, 222b, 222c discussed above with respect to FIG. 2B. Amplifiers 224d, 224e, 224f can have the functionality of analog signal conditioning component 224 discussed above with respect to FIG. 2A and/or amplifiers 224a, 224b, 224c discussed above with respect to FIG. 2B. Analog/digital conversion component 226b can have the functionality of analog/digital conversion component 226 discussed above with respect to FIG. 2A and/or analog/digital conversion component 226a discussed above with respect to FIG. 2B.

EMG device 160 differs from EMG device 110 by the addition of digital signal processing component 240a. Digital signal processing component 240a can convert digital neural signals generated by analog/digital conversion component 226b to digital feature channel(s) 162, as discussed above in the context of digital signal processing component 240 of FIG. 2A. Digital feature channel(s) 162 can then be conveyed to touch-enabled device using communication interface 228b. Communication interface 228b can have the functionality of communication interface 228 discussed above with respect to FIG. 2B.

Figure 3:
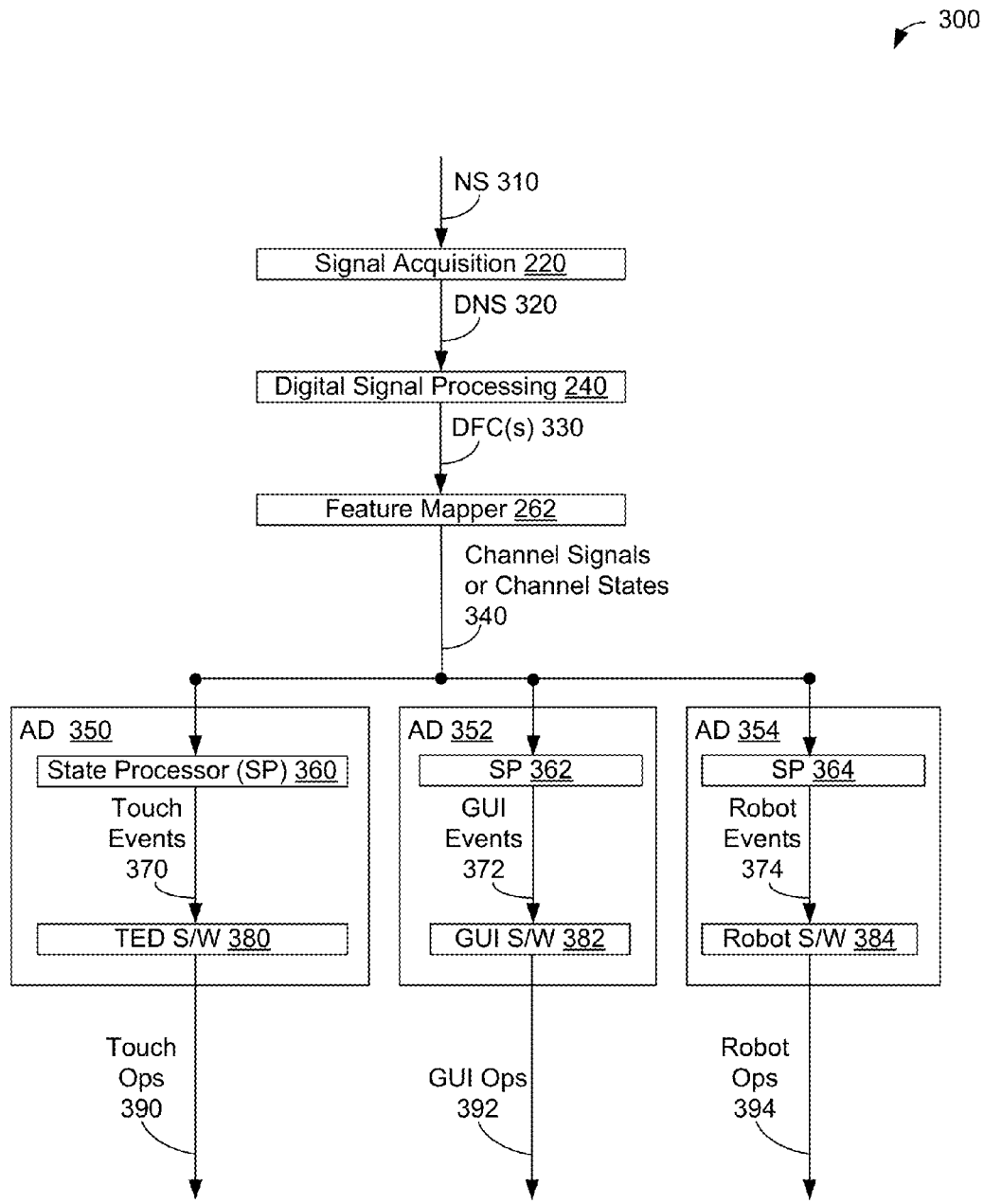
FIG. 3 is a flowchart of a method for generating application-specific operations from neural signals, in accordance with an embodiment.

FIG. 3 is a flowchart of method 300 generating application-specific operations 390, 392, 394 from neural signals (NS) 310, in accordance with an embodiment. Method 300 begins with reception of neural signals 310 from an EMG device or other source; e.g., from EMG device 110, EMG device 160, EMG device 190, or system 200 discussed above at least in the context of FIGS. 1A-2C. Neural signals 310 can be processed by signal acquisition component 220 to generate digital neural signals (DNS) 320, which can be, include, and/or relate to previously-discussed digital neural signals discussed above in the context of FIGS. 1A-2C.

Digital neural signals 320 can be provided to digital signal processing component 240 for generation of digital feature channel(s) 330 as discussed above in the context of at least FIG. 2A. Feature mapper 262 can process received digital feature channel(s) 330 to generate channel signals or channel states 340 as discussed above in the context of at least FIG. 2A.

Channel signals or channel states 340 can be provided to one or more application decoders (ADs), such as application decoders 350, 352, 354. FIG. 3 shows that each respective application decoder 350, 352, 354 has a respective state processor 360, 362, 364 that generates respective events 370, 372, 374. Respective events 370, 372, 374 are received by respective application software 380, 382, 384 that generates respective application-specific operations 390, 392, 394.

For example, application decoder 350 receives channel signals or channel states 340. State processor 360 can receive channel signals or channel states 340 as inputs and generate touch events 370. Touch events 370 can be provided to touch-enabled device (TED) software 380 of a touch-enabled device; e.g., touch-enabled device 120 or 170. Touch-enabled device software can process the touch events 370 to generate touch operations 390.

Muscle activity can be mapped into interactions with a device, such as a touch-enabled device, computing device, or robotic device. For the example of a touch-enabled device, channel signals or channel states 340, which represent muscle activity, can be mapped into a set of touch events, which represent interactions with a touch-based interface. In some embodiments, the touch events can be mapped into single-finger touch operations, such as a tap operation, a double tap operation, and a "drag" or touch-and-hold operation. In other embodiments, the touch events can be mapped into to multi-finger touch operations such as pinch and expand (zoom).

In some embodiments, the virtual touches of the touch-based interface can further be associated with one or more virtual fingers. For example, three channels can represent a first virtual finger VF1, such as a channel for an x position of VF1 on a touch-based interface, a channel for a y position on the touch-based interface, and a channel indicating whether VF1 is touching or not touching the touch-based interface. In this example, three similar channels can represent an x position, a y position, and a touch/not touch state of a second virtual finger VF2. Then, when the x/y position data for VF1 converges toward the x/y position data for VF2, such as along a diagonal line, VF1 and VF2 can be considered to make a pinch operation. When the x/y position data for VF1 diverges from the x/y position data for VF2, such as along another diagonal line, VF1 and VF2 can be considered to make an expand or zoom operation.

Table 3 indicates some example channel states related to virtual touches and virtual fingers.

TABLE 3

| Channel State | Description |
| --- | --- |
| VFx Start Touching TBI | Virtual Finger X initiates a touch of a touch-based interface (TBI), for X = 1, 2, . . . NF; NF = the number of virtual fingers |
| VFx Stop Touching TBI | Virtual Finger X terminates a touch of the touch-based interface |
| VFx Move X-axis xx | Virtual Finger X moves along the X-axis (vertically) xx units. If the touch-based interface includes a display having R + 1 rows and C + 1 columns, xx can range from −C to +C. Sign of xx: xx > 0 indicates rightward movement, and xx < 0 indicates leftward movement. |
| VFx Move Y-axis yy | Virtual Finger X moves along the Y-axis (vertically) yy units. If the touch-based interface includes a display having R + 1 rows and C + 1 columns, yy can range from −R to +R. Sign of yy depends on screen-coordinate implementation; e.g., (x, y) = (0, 0) in upper-left-hand corner of display and (0, maxY) in lower-left-hand corner of display, with maxY > 0. In this example, yy > 0 indicates downward movement, and yy < 0 indicates upward movement. |

In some embodiments, a channel of information Cdist can be provided for a virtual finger $VF_{JC1}$ determined to be in contact with a touch-enabled interface. The Cdist channel can include data about a distance from a position $P_{JC1}$ of $VF_{JC1}$ on the touch-enabled interface and a position $P_{JC2}$ of a virtual finger $VF_{JC2}$ that is both in contact with the touch-enabled interface and is a closest virtual finger to $P_{JC1}$. Then, if the distance data in the Cdist channel indicates that virtual fingers $VF_{JC1}$ and $VF_{JC2}$ are converging; i.e., if the Cdist values decrease over time, then virtual fingers $VF_{JC1}$ and $VF_{JC2}$ can be considered to be performing a pinch operation. Otherwise, if the Cdist values increase over time, then the Cdist channel can indicate that virtual fingers $VF_{JC1}$ and $VF_{JC2}$ are diverging and so $VF_{JC1}$ and $VF_{JC2}$ can be considered to be performing a expand or zoom operation.

In other examples, more, fewer, and/or different channels can be used to represent a virtual finger. In even other examples, channels for more than two virtual finger(s) can be provided. Many other single-finger and multi-finger operations can be determined from channel signals as well.

In some embodiments, there is no concept of a virtual finger or there is only one (implicit) virtual finger. In these embodiments, the channel states of Table 3 can be simplified to be: Start Touching TBI, Stop Touching TBI, Move X-axis xx, and Move Y-axis yy. Many other channel states are possible as well.

As mentioned above, for the example of a touch-enabled device, state processor 360 can generate touch events 370. In some embodiments, the virtual touches of the touch-based interface can further be associated with multiple virtual fingers. Table 4 indicates some example touch events related to virtual touches and virtual fingers.

TABLE 4

| Touch Events | Description |
| --- | --- |
| VFx Touch Detected | Virtual Finger X initiates a touch of a touch-based interface, with X = 1, 2, NF; NF = the number of virtual fingers. |
| VFx Touch Lifted | Virtual Finger X terminates a touch of the touch-based interface |
| VFx Move Touch to (x1,y1) | Virtual Finger X moves to a position (x1, y1) on a display associated with the touch-based interface. If the display has R + 1 rows and C + 1 columns with 0-based addressing, x1 can range from 0 to C and y1 can range from 0 to R. |

In some embodiments, there is no concept of a virtual finger or there is only one (implicit) virtual finger. In these embodiments, the touch events of Table 4 can be simplified to be: Touch Detected, Touch Lifted, and Move Touch to (x1, y1). In other embodiments, a Touch Detected touch event can include a position (x2, y2) where the touch was detected. Many other touch events are possible as well.

Operating systems, or control software, for touch-enabled devices, such as but not limited to the Windows® 8 operating system from the Microsoft Corporation of Bellevue, Wash. and the Android™ operating system from Google Inc. of Mountain View, Calif., can be modified to override the methods that are listening solely to touch-based interfaces for touch events. In particular, the operating system for a touch-enabled device can be modified to listen to the wireless connection with the EMG device for channel states and/or touch events related to a touch-based interface.

Operating systems for touch-enabled devices can have four main functional components: sensor input, information input, information output, and background processing. The sensor input component can constantly listening to, and process data for sensors on a touch-enabled device. For example, the sensor input component can receive touch data about touch events, such as single-finger or multi-finger input, on a touch-based interface, audio data from a microphone of the touch-enabled device, and/or accelerometer data of the touch-enabled device as the device moves. The sensor input component can send these values to the background processing component.

The background processing component can process the input signals from the sensor input component (and other components) and provide a context for a currently-running process. Thus, applications executing as part of the currently-running process can react properly when the user supplies different information via the input interfaces. The information input component can obtain data from one or more communication networks, such as the Internet, or other sources; e.g., sensors connected to, but not part of, the touch-enabled device. The information output component can output information to a display screen, a speaker, a vibration device, and/or other output device.

EMG-interface software can run as a software application of the touch-enabled device to process data from the EMG device as sensor input. For example, the EMG-interface software on the touch-enabled device can receive channel states and/or touch events from the EMG device. If the EMG-interface software receives channel states from the EMG, the EMG-interface software can include a decoder, such as decoder 130, shown in FIG. 1A.

Touch events 370 can be received by touch screen software 380 of a touch-enabled device for conversion into touch screen operations 390. Touch screen software 380 can be or include a driver or other software that converts touch events 370 into internal commands of the touch-enabled device that would be generated by touches of the touch-based interface corresponding to touch events 370. In some embodiments, touch screen software 380 can be separate from application software configured to interact with the touch-based interface to perform other functions than touch-event processing, while in other embodiments, touch screen software 380 can be a portion of the application software configured to interact with the touch-based interface while performing the other functions than touch-event processing.

Touch screen operations 390 include operations that could be, but are not, performed by touching a touch-based interface of the touch-enabled device. Examples of touch screen operations 390 include, but are not limited to, selection operations, de-selection operations, drag operations, tap operations, multiple-tap (e.g., double-tap and triple-tap) operations, pinch operations, expand/zoom operations, circling/area-selection operations, button presses and releases, other operations performable by one or more fingers (or other appendages) touching the touch-based interface of the touch-enabled device but instead performed by processing of touch events 370 by touch screen software 380.

In the example of a computing device with a graphical user interface (GUI), channel signals or channel states 340 can convey similar information to that conveyed for the example of a touch-enabled device. That is, channel signals or channel states 340 can convey information generated from neural signals about a pointer device used to control the GUI, such as a mouse, and a display device used to show the GUI, such as a monitor or screen. For example, this information can relate to an x position of the pointer device with respect to the display device, a y position of the pointer device with respect to the display device, and a status of the pointer device; e.g., mouse-button down, mouse-button up.

Then, state processor 362 can generate GUI events 372 from channel signals or channel states 340. Example GUI events 372 can include Move Pointer to (x, y), Pointer Button PB Down, and Pointer Button PB Up, where (x, y) specify a position on the display device displaying the GUI, and PB specifies a pointer button number, PB=0 or more. Then, GUI events 372 can be received and processed by GUI software 382 to generate GUI operations 392, such as, but not limited to, moving a GUI object (e.g., a window, icon, displayed object), resizing a GUI object, selecting a GUI object, deselecting a GUI object, providing one or more button presses to a GUI object, dragging out a region of the display, and dropping a GUI object. Many other and perhaps different GUI events 372 and GUI operations 392 are possible as well.

In the example of a robotic device, channel signals or channel states 340 can convey information generated from neural signals related to control the robotic device, which can have zero or more effectors, such as robotic hands or tools. For example, this information can relate to a direction of movement of the robotic device, a rotation/configuration of the robotic device, a desired speed of movement of the robotic device, a desired direction of movement of an effector of the robotic device, a desired rotation/configuration of the effector, a desired speed of movement of the effector, and a status of the effector; e.g., close grip of a hand acting as the effector, open grip of the hand.

Then, state processor 364 can generate robot events 374 from channel signals or channel states 340. Example robot events 374 can include Move Robot to (x, y, z), Rotate Robot by DD degrees in Axis AX; Set Robot Speed to SP, Stop Robot, Move Effector EF to (x1, y1, z1), Rotate Effector EF by DD1 degrees in Axis AX1; Set Effector EF1 Speed to SP1, Stop Effector EF1, Open Effector EF1, Close Effector EF1, where (x, y, z) and (x1, y1, z1) are locations in three-dimensional space, DD and DD1 are numbers of degrees, AX, AX1 are axes (e.g., X axis, Y axis, Z axis), SP and SP1 are speeds; e.g., 0.1 MPH, 0.05 meters per second, and EF1 is an effector identifier. Robot events 374 can be received and processed by robot software 384 operating on the robotic device or another device to generate robot operations 394. Robot operations 394 can include operations such as, but not limited to, moving the robotic device, rotating the robotic device, stopping the robotic device, stopping rotation of the robotic device, set a speed of the robotic device, moving an effector of the robotic device, rotating the effector, stopping the effector, stopping rotation of the effector, set a speed of the effector, and change a status of the effector, such as opening or closing a grip of the effector. Many other and perhaps different robot events 374 and robot operations 394 are possible as well.

Example EMG Calibration Methods

The system can provide directed calibration, where the interface suggests the movement and shows visual feedback using the touch-enabled device. In some embodiments, calibration is computed on the touch-enabled device, but other embodiments can also use a network-based or cloud service to perform calibration and return the results to the system. Calibrating current EMG signals can involve a relatively-fast computation for decoding signal input, so that the herein-described calibration methods can use a relatively-small amount of power to avoid battery drain on a touch-enabled device, EMG device, or other device performing calibration.

The system can use calibration data to distinguish, and subsequently ignore, intermittent and unintentional events. For example, the system can determine whether neural signals relate to background muscle movement for another task rather than neural signals that have been calibrated to control the touch-enabled device. In particular, the calibration algorithm can determine a ground truth for a desired movement related to the touch-enabled device, and can look for independence in the variables to extract a control signal during calibration. The system can improve system responsiveness as the user becomes better aware of which muscles control neural signaling used by system, and thus provide positive feedback to the user.

An individual user can try different calibration regimens to see which works the best for them, or by tracking their performance over time, new calibration techniques may be suggested. The suggested calibration techniques can be based on performance gaps, analysis for which calibration techniques works best for similar users, and on other criteria. In some embodiments, calibration technique suggestions can include suggestions on placement of the EMG device and/or muscles/muscle groups to be used for neural signaling.

The system can operate properly throughout the day despite fundamental changes to the inputs generated by the user; e.g., changes in EMG electrode position, changes in sleep/waking state, changes in activity, etc. Accordingly, calibration can be performed frequently; e.g., several times a day. Calibration can be triggered periodically; i.e., at time increments, manually triggered by the user or other person, or automatically triggered. For example, calibration can be suggested or triggered based on a performance velocity measure, such as a rate of change in channel signals, a rate of change in channel states, and/or a rate of change in touch events. In some embodiments, system can compare the performance velocity measure to a threshold velocity, and if the performance velocity measure is below the threshold, the system can trigger calibration or suggest calibration; e.g., prompts the user to re-calibrate.

After the user finishes calibration, the system can compute relative levels of signal noise, as well as accuracy, precision, and latency in user muscle activity performed during calibration. The system can use the signal noise, accuracy, precision, and latency data to generate control signals, such as channel states and/or touch events, to control the touch-enabled device. Then, a decoder of the system can use the calibrated data to generate channel states and/or touch events for interacting with an application of the touch-enabled device.

In some embodiments, the system can use the calibration data to enhance selectivity for channel states and touch events whose calibration muscle performance was relatively degraded; e.g., suppose a user usually provides neural signals having a signal strength S to move a virtual finger upward, but calibration indicates that today's signal strength is 0.8 S, then the system can be selectively sensitive to neural signals to move the virtual finger upward. As another example, if calibration indicates a relatively-high amount of signal noise, certain operations, like tap, drag, pinch, etc. can take longer to perform than otherwise to ensure the signal properly indicates performance of the triggered operation; i.e., channel signals related to the triggered operation can remain in that operation's 'bin' longer than usual before performing that operation.

Generation of channel information and/or touch events based on calibration can match the capabilities of the system and the user to help to match fluctuations in muscle performance over time. That is, the system can keep and maintain historical calibration data to select sensitivities and duration thresholds for neural signals before triggering generation of touch events, which can allow the system to control the touch-enabled device based on the user's current control capabilities. If permitted by the user, calibration data can be shared to verify, correlate, and perhaps enhance performance levels and calibration techniques across a population of users, such as a population with a similar dexterity to that of the user.

Figure 4:
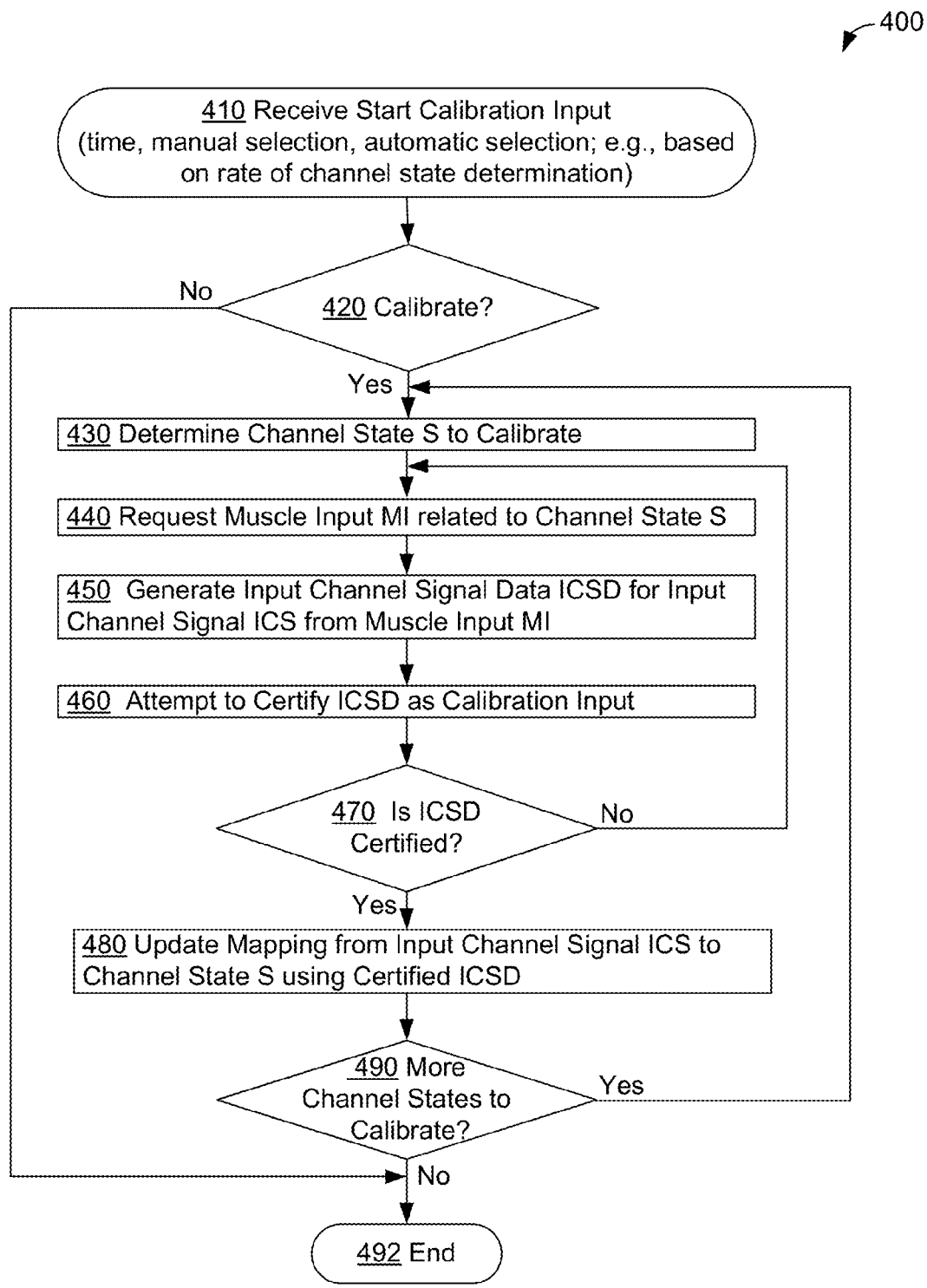
FIG. 4 is a flowchart of a calibration method, in accordance with an embodiment.

FIG. 4 is a flowchart of calibration method 400, in accordance with an embodiment. Method 400 can begin at block 410, where calibration start input is received at one or more devices calibrating a system for operating a touch-based device using EMG signals, such as but not limited to system 100 discussed above in the context of FIG. 1A or system 150 discussed above in the context of FIG. 1B. For example, an EMG device such as but not limited to EMG device 110 or EMG device 160, a touch-enabled device such as touch-enabled device 120 or touch-enabled device 180, or another device; e.g., a calibration server, can perform part or all of calibration method 400 including but not limited to the functionality of block 410.

At block 410, the start calibration input can be periodic or otherwise time based; e.g., calibration process 400 can be performed every 30 minutes, every two hours, or every day. The start calibration input can be a manual input; e.g., a button is pressed or other operation performed by a user or other entity to initiate calibration process 400.

Calibration can be performed partially or completely automatically. As an example, calibration can be performed upon a manual input to power up a touch-enabled device and/or an EMG device; e.g., the power button is pressed or otherwise activated for the touch-enabled device and/or the EMG device. In particular, the "second power up" input can trigger calibration; that is, input to power up a touch-enabled device or input to power up an associated EMG device by itself will not trigger calibration, but input to powering up the latter-powered-up of the touch-enabled device and an associated EMG device so that both devices are powered up will trigger calibration. Similarly, associating an EMG device and a touch-enabled device for a first time after power up of the touch-enabled device or the associated EMG device can trigger calibration.

Another technique for automatic calibration can be based on rates of system processing; such as a rate of channel signal generation, a rate of channel state generation, and/or a rate of touch event generation. For example, suppose that system 100 typically generate X channel signals per minute from user 102 at EMG device 110. Then, at for a given minute M1, EMG device 110 generated 0.5X channel signals per minute from user 102. The drop in the channel signal rate from X signals/minute to 0.5X signals/minute can indicate that EMG device 110 is improperly positioned on muscles of user 102 or is otherwise sub-optimally configured for channel signal generation, and therefore sub-optimally configured for use to control touch-enabled device 120. Similar examples can utilize comparisons of typical, expected, or other baseline rates of signal processing with actual rates of signal processing.

The comparison of actual and baseline rates can involve comparisons of specific values of signal generation rates; e.g., comparison of an actual rate of channel state generation with an expected rate of at least 60 channel states per minute, a range of signal generation rates; e.g., comparison of an actual rate of touch event generation with an expected range of rates between 10 and 90 touch events per minute, a percentage of a baseline rate; e.g., comparison of an actual rate of channel state generation with a predetermined percentage of a baseline rate; e.g., at least 80% of an average observed rate of channel state generation, or predetermined range of percentages; e.g., between 60% and 120% of an expected rate of channel state generation. Other techniques for comparing actual and baseline rates of signal generation are possible as well.

At block 420, a decision is made to perform the remainder of calibration method 400. If calibration is to be performed, calibration method 400 can proceed to block 430. Otherwise, calibration is not to be performed and calibration method 400 can proceed to block 492 to end.

At block 430, a determination is made to which channel state S to calibrate. Example channel states are provided in the context of at least FIGS. 2B and 3, with example channel states indicated in Table 3 above.

At block 440, a request to provide a muscle input MI related to channel state S is made. For example, suppose channel state S being calibrated relates to a virtual finger VF1 touching a touch-based interface. Then, at block 440, a request can be made via a touch-enabled device (or other device) to a user to make muscle motions that the user would perform to generate neural signals related to touching virtual finger VF1 to the touch-based interface. The request can be accompanied by graphical, auditory, and or other feedback at least as discussed below in the context of block 470.

At block 450, muscle inputs can be received. Based on received muscle inputs, input channel signal data ICSD for input channel signal ICS is generated. Generation of channel states from channel signals is discussed above in the context of at least FIGS. 2B and 3.

At block 460, input channel signal data ICSD can be attempted to be certified. In this context, the ICSD can be certified for suitability for calibration. The ICSD may not be certified if the ICSD is: unrelated to channel state S, includes too much noise for calibration, too weak or too strong for calibration, or is insufficient duration to ensure that muscle input MI relates to channel state S. Other reasons for certifying or not certifying ICSD are possible as well.

At block 470, a determination can be made whether ICSD is certified for calibration. If ICSD is not certified for calibration, additional data can be requested and obtained by having calibration process 400 proceed to block 430. Otherwise, ICSD is certified for calibration, and calibration process 400 can proceed to block 480.

In the example where channel state S relates to a touch of virtual finger F1, when the user generates (or fails to generate) neural signals certifiable for calibration of touching virtual finger VF1 to the touch-based interface, then the touch-enabled device can indicate success (or failure) to generate the requested neural signals by displaying text and/or graphics, play sounds such as tones and/or music, and/or provide other feedback; e.g., activate/deactivate a vibrating device. In particular, when successful, a successful button press or other touch of virtual finger VF1 to the touch-based interface can be shown when the appropriate signals certifiable for calibration are received, and an unsuccessful button press or other touch of virtual finger VF1 to the touch-based interface can be shown when the appropriate signals certifiable for calibration are not received.

At block 480, a mapping from an input channel signal ICS to channel state S is updated based on certified input channel signal data ICSD. Continuing the example where channel state S relates to a touch of virtual finger F1, input channel signal data ICSD can relate to an input channel signal ICS for moving a muscle M2 desired by a user to indicate a touch of virtual finger VF1. ICSD can include signal information, such as received electrode information, signal strength information, signal transition information (muscle resting to active or vice versa), signal noise information, and/or other information related to calibrated input channel data.

Then, after calibration, when muscle M2 is moved in an attempt to touch virtual finger VF1 to the touch-based interface, the received data can be compared to the calibration data stored in the mapping of input channel signal to channel states. If the received data is similar to or the same as the stored calibration data, then channel state S can be generated, which corresponds to a touch virtual finger VF1 to the touch-based interface in this example.

At block 490, a determination is made as to whether there are more channel states or other signals to calibrate. If there are more channel states or other signals to calibrate, calibration method 400 can proceed to block 430. Otherwise, there are no more channel states or other signals to calibrate and calibration method 400 can proceed to block 492 to end.

In some embodiments, channel states may not be utilized. In these embodiments, other signals, such as channel signals or touch events, can be calibrated using calibration process 400 rather than channel signals. In these embodiments, other data rather than input channel signal data ICSD, such as neural signal data, can be received, certified for calibration, and then used in a mapping from an input signal to the signal being calibrated. Generation of inputs related to other signals that can be calibrated, such as channel signals or touch events, are discussed above in the context of FIGS. 2B and 3.

In some embodiments, the system can protect the privacy of users and protect communications from interception. To protect privacy, communications between the EMG device and the touch-enabled device can be encrypted or otherwise secured. The EMG device and/or touch-enabled device can be protected by passwords or biometrics. In particular embodiments, calibration method 400 can be used to provide biometric information to protect the EMG device. For example, the user can be requested to perform a calibration session to generate current input channel signal data. The current input channel signal data can be compared to previously-stored input channel signal data. If the current input channel signal data at least approximately matches the previously-stored input channel signal data, then the EMG device can determine that the current user is the previous user, and assume the EMG device is being used by the correct, and current, user.

Point-to-point links, e.g., a Bluetooth® paired link, a wired communication link, can be used to reduce (inadvertent) interception of system communications. For more public systems, such as systems using Wi-Fi® or Wireless Wide Area Network (WWAN) communications, secure links and networks can be used to protect privacy and interception. The system can also use communication techniques, such as code sharing and time-slot allocation, that protect against inadvertent and/or intentional interception of communications. Many other techniques to protect user security and communication interception can be used by the system as well.

In still other embodiments, channel signals can be determined based on binning neural signal value data into bins specified by ranges of values. These ranges of values can be can be reset and/or adjusted during the calibration process 400.

Example Computing Network

Figure 5A:
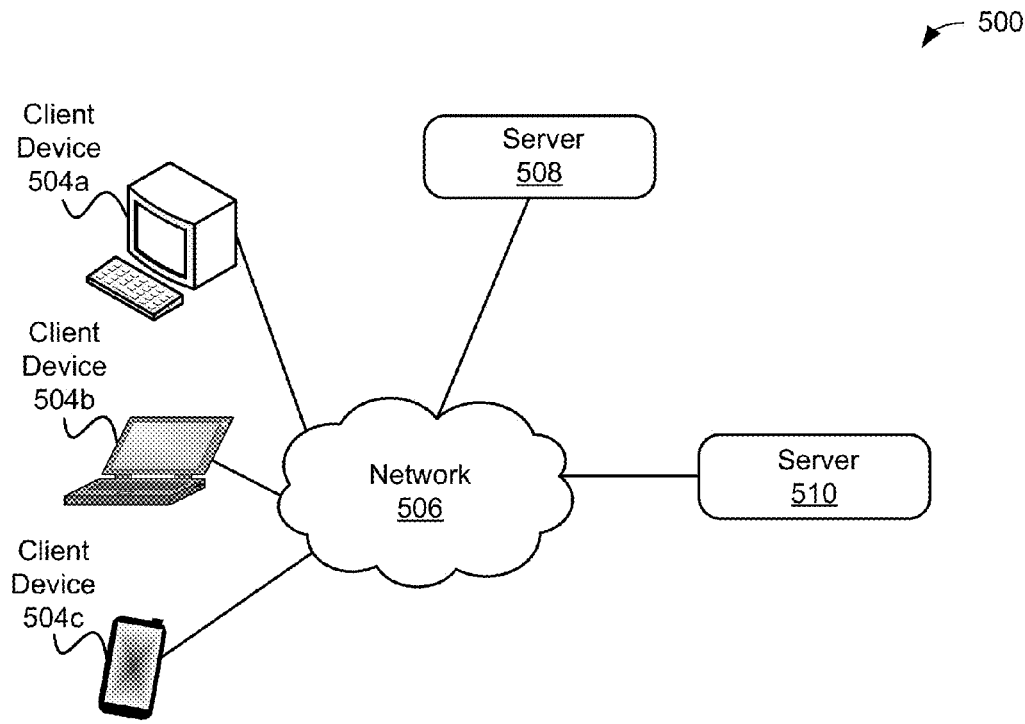
FIG. 5A is a block diagram of an example computing network, in accordance with an embodiment.

FIG. 5A is a block diagram of example computing network 500 in accordance with an example embodiment. In FIG. 5A, servers 508 and 510 are configured to communicate, via a network 506, with client devices 504a, 504b, and 504c. As shown in FIG. 5A, client devices can include a personal computer 504a, a laptop computer 504b, and a smart-phone 504c. More generally, client devices 504a-504c (or any additional client devices) can be any sort of computing device, such as a workstation, network terminal, desktop computer, laptop computer, wireless communication device (e.g., a cell phone or smart phone), and so on. In particular, some or all of client devices 504a-504c can be a touch-enabled device such as touch-enabled device 120 or 170, an EMG device such as EMG device 110 or 160, and/or a system with a touch-enabled device and an EMG device; e.g., system 100, system 150.

The network 506 can correspond to a local area network, a wide area network, a corporate intranet, the public Internet, combinations thereof, or any other type of network(s) configured to provide communication between networked computing devices. In some embodiments, part or all of the communication between networked computing devices can be secured.

Servers 508 and 510 can share content and/or provide content to client devices 504a-504c. As shown in FIG. 5A, servers 508 and 510 are not physically at the same location. Alternatively, servers 508 and 510 can be co-located, and/or can be accessible via a network separate from network 506. Although FIG. 5A shows three client devices and two servers, network 506 can service more or fewer than three client devices and/or more or fewer than two servers. In some embodiments, servers 508, 510 can perform some or all of the herein-described methods; e.g., calibration method 400.

Example Computing Device

Figure 5B:
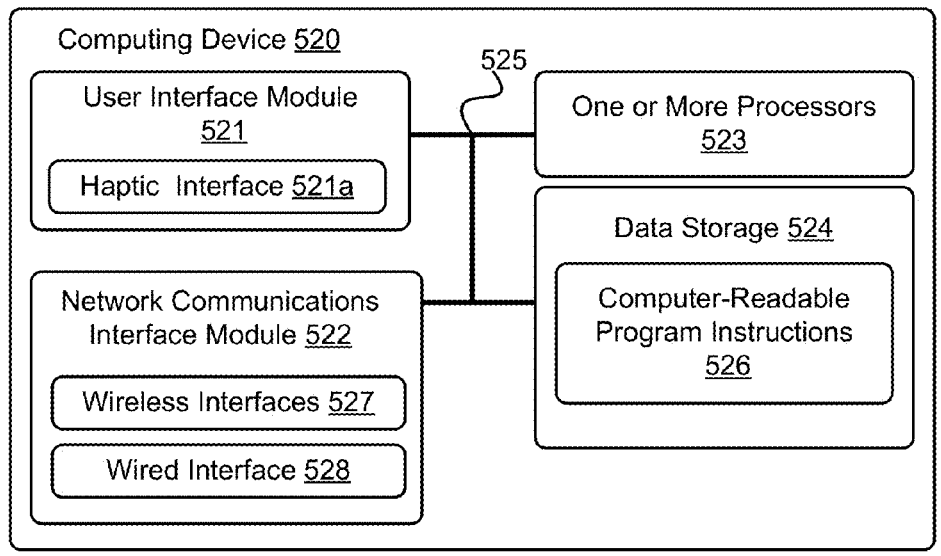
FIG. 5B is a block diagram of an example computing device, in accordance with an embodiment.

FIG. 5B is a block diagram of an example computing device 520 including user interface module 521, network-communication interface module 522, one or more processors 523, and data storage 524, in accordance with embodiments of the invention.

In particular, computing device 520 shown in FIG. 5A can be configured to perform one or more functions of systems 100, 150, 180a, 180b, 200, EMG device 110, EMG device 160, touch-enabled device 120, touch-enabled device 170, signal acquisition component 220, digital signals processing component 240, decoder 260, application decoders 350, 352, 354, client devices 504a-504c, network 506, and/or servers 508, 510. Computing device 520 may include a user interface module 521, a network-communication interface module 522, one or more processors 523, and data storage 524, all of which may be linked together via a system bus, network, or other connection mechanism 525.

Figure 6:
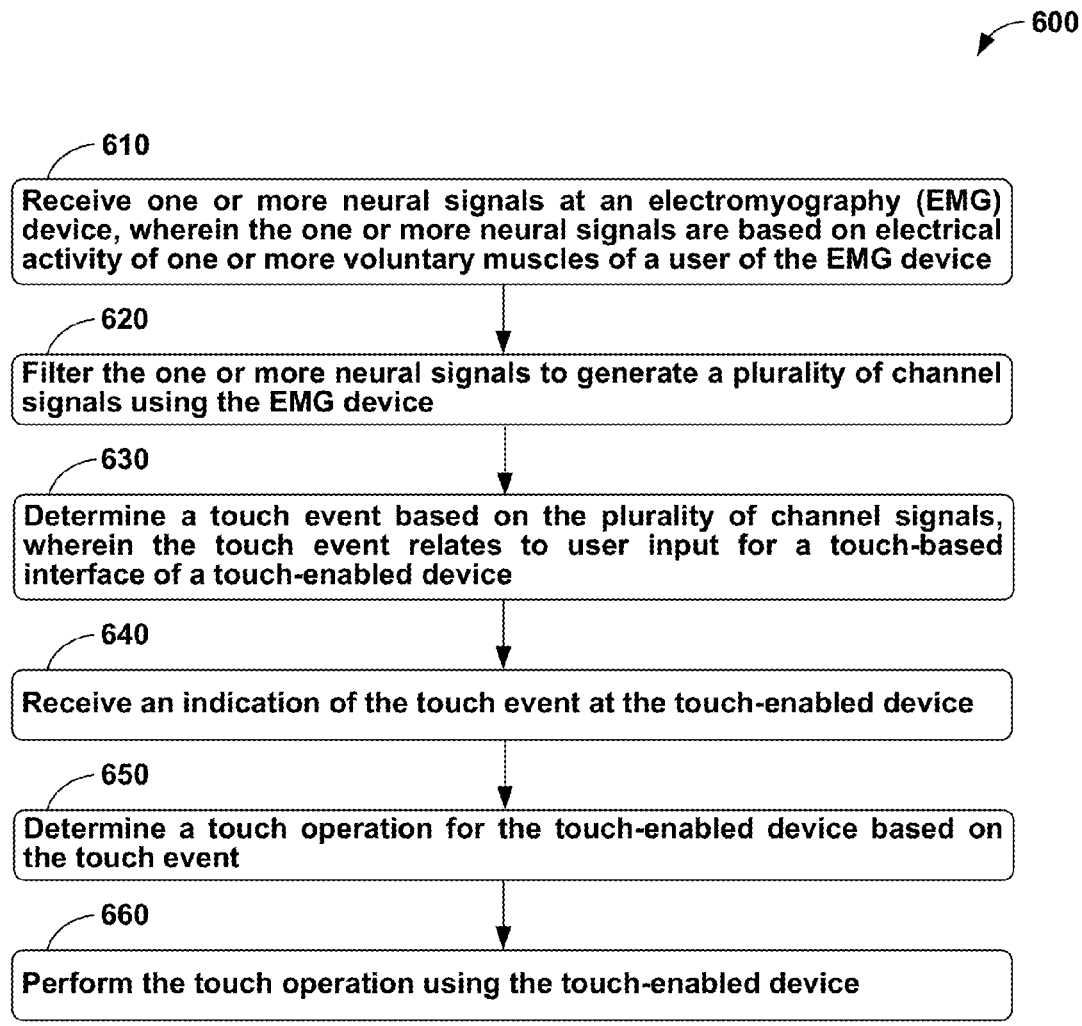
FIG. 6 is a flow chart of an example method, in accordance with an embodiment.

Computing device 520 can be a desktop computer, laptop or notebook computer, personal data assistant (PDA), mobile phone, embedded processor, touch-enabled device, or any similar device that is equipped with at least one processing unit capable of executing machine-language instructions that implement at least part of the herein-described techniques and methods, including but not limited to method 300 described with respect to FIG. 3, method 400 described with respect to FIG. 4, and/or method 600 described with respect to FIG. 6.

User interface 521 can receive input and/or provide output, perhaps to a user. User interface 521 can be configured to send and/or receive data to and/or from user input from input device(s), such as a keyboard, a keypad, a touch screen, a computer mouse, a track ball, a joystick, and/or other similar devices configured to receive input from a user of the computing device 520. In some embodiments, input devices can include EMG-related devices, such EMG device 110, EMG device 160, and/or electrodes 210a-210c and 260a-260c. User interface 521 can be configured to provide output to output display devices, such as one or more cathode ray tubes (CRTs), liquid crystal displays (LCDs), light emitting diodes (LEDs), displays using digital light processing (DLP) technology, printers, light bulbs, and/or other similar devices capable of displaying graphical, textual, and/or numerical information to a user of computing device 520. User interface module 521 can also be configured to generate audible output (s), such as a speaker, speaker jack, audio output port, audio output device, earphones, and/or other similar devices configured to convey sound and/or audible information to a user of computing device 520. As shown in FIG. 5B, user interface can be configured with haptic interface 521a that can receive inputs related to a Haptic Interface Point, a remote device configured to be controlled by haptic interface 521a, and/or other inputs, and provide haptic outputs such as tactile feedback, vibrations, forces, motions, and/or other touch-related outputs.

Network-communication interface module 522 can be configured to send and receive data over wireless interface 527 and/or wired interface 528 via a network, such as network 506. Wireless interface 527 if present, can utilize an air interface, such as a Bluetooth®, Wi-Fi®, ZigBee®, and/or WiMAX™ interface to a data network, such as a wide area network (WAN), a local area network (LAN), one or more public data networks (e.g., the Internet), one or more private data networks, or any combination of public and private data networks. Wired interface(s) 528, if present, can comprise a wire, cable, fiber-optic link and/or similar physical connection(s) to a data network, such as a WAN, LAN, one or more public data networks, one or more private data networks, or any combination of such networks.

In some embodiments, network-communication interface module 522 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications.

Processor(s) 523 can include one or more central processing units, computer processors, mobile processors, digital signal processors (DSPs), microprocessors, computer chips, and/or other processing units configured to execute machine-language instructions and process data. Processor(s) 523 can be configured to execute computer-readable program instructions 526 that are contained in data storage 524 and/or other instructions as described herein.

Data storage 524 can include one or more physical and/or non-transitory storage devices, such as read-only memory (ROM), random access memory (RAM), removable-disk-drive memory, hard-disk memory, magnetic-tape memory, flash memory, and/or other storage devices. Data storage 524 can include one or more physical and/or non-transitory storage devices with at least enough combined storage capacity to contain computer-readable program instructions 526 and any associated/related data structures.

Computer-readable program instructions 526 and any data structures contained in data storage 526 include computer-readable program instructions executable by processor(s) 523 and any storage required, respectively, to perform at least part of herein-described methods, including but not limited to method 300 described with respect to FIG. 3, method 400 described with respect to FIG. 4, and/or method 600 described with respect to FIG. 6.

Example Methods of Operation

FIG. 6 is a flow chart of an example method 600. Method 600 can be carried out by a remotely-operable device, such as discussed above in the context of at least FIGS. 1A-5B.

Method 600 can begin at block 610, where an EMG device can receive one or more neural signals. The neural signals can be based on electrical activity of one or more voluntary muscles of a user of the EMG device. At block 620, the EMG device can filter the one or more neural signals to generate a plurality of channel signals using the EMG device.

At block 630, a touch event can be determined based on the plurality of channel signals. The touch event can relate to user input for a touch-based interface of a touch-enabled device. In some embodiments, determining the touch event based on the plurality of channel signals can include: receiving at least one designated channel signal of the plurality of channel signals; determining a channel state of a plurality of channel states corresponding to the at least one designated channel signal based on a mapping between channel signals and the plurality of channel states; and determining the touch event based on the channel state.

In other embodiments, determining the touch event based on the plurality of channel signals can include determining the touch event using a state processor.

At block 640, the touch-enabled device can receive an indication of the touch event. At block 650, the touch-enabled device can determine a touch operation for the touch-enabled device based on the touch event. In some embodiments, determining the touch operation for the touch-enabled device based on the touch event can include: providing the touch event to touch-enabled device software, and determining the touch operation for the touch-enabled device using the touch-enabled device software. At block 660, the touch-enabled device can perform the touch operation.

In some embodiments, method 600 can also include calibrating the EMG device, by at least: determining a calibrating channel state of the plurality of channel states; requesting a calibrating muscle input related to the calibrating channel state; generating calibrating channel signal input data from the calibrating muscle input; certifying of the calibrating channel signal input data; and updating the mapping between channel signals and the plurality of channel states based on the certified calibrating channel signal input data.

In particular embodiments, calibrating the EMG device can include calibrating the EMG device on a periodic basis. In other particular embodiments, determining the channel state of the plurality of channel states comprises determining a rate of channel-state generation. In these other particular embodiments, calibrating the EMG device can include calibrating the EMG device based on the rate of channel-state generation. In specific of these embodiments, calibrating the EMG device based on the rate of channel-state generation can include: determining whether the rate of channel-state generation is less than a threshold rate of channel-state generation and, after determining that the rate of channel-state generation is less than the threshold rate of channel-state generation, calibrating the EMG device.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein," "above" and "below" and words of similar import, when used in this application, shall refer to this application as a whole and not to any particular portions of this application.

The above description provides specific details for a thorough understanding of, and enabling description for, embodiments of the disclosure. However, one skilled in the art will understand that the disclosure may be practiced without these details. In other instances, well-known structures and functions have not been shown or described in detail to avoid unnecessarily obscuring the description of the embodiments of the disclosure. The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure can be modified, if necessary, to employ the systems, functions and concepts of the above references and application to provide yet further embodiments of the disclosure. These and other changes can be made to the disclosure in light of the detailed description.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

Numerous modifications and variations of the present disclosure are possible in light of the above teachings.

What is claimed:

1. A method, comprising:
    receiving one or more neural signals at an electromyography (EMG) device, wherein the one or more neural signals are based on electrical activity of one or more voluntary muscles of a user of the EMG device;
    filtering the one or more neural signals to generate a plurality of channel signals using the EMG device;
    determining a touch event based on the plurality of channel signals, wherein the touch event relates to user input for a touch-based interface of a touch-enabled device, and wherein determining the touch event based on the plurality of channel signals comprises:

receiving at least one designated channel signal of the plurality of channel signals;

determining a channel state of a plurality of channel states corresponding to the at least one designated channel signal based on a mapping between channel signals and the plurality of channel states;

determining a rate of channel-state generation for the plurality of channel states; and determining the touch event based on the channel state;

calibrating the EMG device based on the rate of channel-state generation and a threshold rate of channel-state generation;

receiving an indication of the touch event at the touch-enabled device;

determining a touch operation for the touch-enabled device based on the touch event; and performing the touch operation using the touch-enabled device.

2. The method of claim 1, wherein calibrating the EMG device comprises:

determining a calibrating channel state of the plurality of channel states;

requesting a calibrating muscle input related to the calibrating channel state;

generating calibrating channel signal input data from the calibrating muscle input;

certifying the calibrating channel signal input data; and updating the mapping between channel signals and the plurality of channel states based on the certified calibrating channel signal input data.

3. The method of claim 2, wherein calibrating the EMG device comprises calibrating the EMG device on a periodic basis.

4. The method of claim 1, wherein calibrating the EMG device comprises:

determining whether the rate of channel-state generation is less than the threshold rate of channel-state generation; and after determining that the rate of channel-state generation is less than the threshold rate of channel-state generation, calibrating the EMG device.

5. The method of claim 1, wherein determining the touch event based on the plurality of channel signals comprises determining the touch event using a state processor.

6. The method of claim 1, wherein determining the touch operation for the touch-enabled device based on the touch event comprises:

providing the touch event to touch-enabled device software; and determining the touch operation for the touch-enabled device using the touch-enabled device software.

7. An electromyography (EMG) device, comprising:

one or more electrodes, each electrode configured to receive one or more neural signals based on electrical activity of one or more voluntary muscles of a user of the EMG device;

a processor; and a non-transitory tangible computer readable medium configured to store at least executable instructions, wherein the executable instructions, when executed by the processor, cause the EMG device to perform functions comprising:

filter the one or more neural signals to generate a plurality of channel signals;

determine a touch event based on the plurality of channel signals, wherein the touch event relates to a user input for a touch-based interface of a touch-enabled device; and send an indication of the touch event;

determine a rate of channel-state generation for the plurality of channel states; and calibrate the EMG device based on the rate of channel-state generation and a threshold rate of channel-state generation.

8. The EMG device of claim 7, further comprising:

one or more amplifiers, each amplifier configured to amplify one or more neural signals.

9. The EMG device of claim 7, wherein determining the touch event based on the plurality of channel signals comprises:

receiving at least one designated channel signal of the plurality of channel signals;

determining a channel state of a plurality of channel states corresponding to the at least one designated channel signal based on a mapping between channel signals and the plurality of channel states; and determining the touch event based on the channel state.

10. The EMG device of claim 9, wherein calibrating the EMG device comprises:

determining a calibrating channel state of the plurality of channel states;

requesting a calibrating muscle input related to the calibrating channel state;

generating calibrating channel signal input data from the calibrating muscle input;

performing a certification of the calibrating channel signal input data; and after performing the certification, updating the mapping between channel signals and the plurality of channel states based on the calibrating channel signal input data.

11. The EMG device of claim 10, wherein calibrating the EMG device comprises calibrating the EMG device on a periodic basis.

12. The EMG device of claim 7, wherein calibrating the EMG device comprises:

determining whether the rate of channel-state generation is less than a threshold rate of channel-state generation; and after determining that the rate of channel-state generation is less than the threshold rate of channel-state generation, calibrating the EMG device.

13. A system, comprising:

an electromyography (EMG) device, configured to at least:

receive one or more neural signals, wherein the one or more neural signals are based on electrical activity of one or more voluntary muscles of a user of the EMG device, filter the one or more neural signals to generate a plurality of channel signals, send the plurality of channel signals, determine a plurality of channel states based on a mapping between the plurality of channel signals and the plurality of channel states, determine a rate of channel-state generation for the plurality of channel states, calibrate the EMG device based on the rate of channel-state generation and a threshold rate of channel-state generation; and a touch-enabled device, comprising a touch-based interface and configured to at least:

receive the plurality of channel signals, determine a touch event based on the plurality of channel signals, wherein the touch event relates to a user input for the touch-based interface, determine a touch operation based on the touch event, and perform the touch operation.

14. The system of claim 13, wherein the touch-enabled device comprises an application, and wherein performing the touch operation comprises:

provi ding the touch operation to the application; and in response to the touch operation, the application performing a function related to the touch operation.

15. The system of claim 13, wherein determining the touch event based on the plurality of channel signals comprises:

receiving at least one designated channel signal of the plurality of channel signals;

determining a channel state of a plurality of channel states corresponding to the at least one designated channel signal based on a mapping between channel signals and the plurality of channel states; and determining the touch event based on the channel state.

16. The system of claim 15, wherein the system is configured to be calibrated by at least:

determining, at the touch-enabled device, a calibrating channel state of the plurality of channel states to calibrate;

requesting a calibrating muscle input related to the calibrating channel state using the touch-enabled device;

generating calibrating channel signal input data from the calibrating muscle input, using the EMG device;

receiving the calibrating channel signal input data at the touch-enabled device;

performing a certification of the calibrating channel signal input data using the touch-enabled device; and after performing the certification, updating the mapping between channel signals and the plurality of channel states based on the calibrating channel signal input data.

* * * * *